United States Patent
Ohno

(10) Patent No.: US 10,464,470 B2
(45) Date of Patent: Nov. 5, 2019

(54) VEHICLE LAMP

(71) Applicant: Stanley Electric Co., Ltd., Tokyo (JP)

(72) Inventor: Masafumi Ohno, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 218 days.

(21) Appl. No.: 15/596,847

(22) Filed: May 16, 2017

(65) Prior Publication Data

US 2017/0334337 A1 Nov. 23, 2017

(30) Foreign Application Priority Data

May 17, 2016 (JP) ................................. 2016-099024

(51) Int. Cl.
*B60Q 1/08* (2006.01)
*B60Q 1/12* (2006.01)
(Continued)

(52) U.S. Cl.
CPC ............ *B60Q 1/085* (2013.01); *B60Q 1/122* (2013.01); *B60Q 1/143* (2013.01); *B62D 15/021* (2013.01); *F21S 41/14* (2018.01); *F21S 41/16* (2018.01); *F21S 41/25* (2018.01); *F21S 41/36* (2018.01); *G06K 9/00805* (2013.01); *H04N 7/183* (2013.01); *H04N 9/3161* (2013.01); *H04N 9/3182* (2013.01); *H04N 9/3188* (2013.01); *B60Q 2300/054* (2013.01); *B60Q 2300/056* (2013.01); *B60Q 2300/112* (2013.01); *B60Q 2300/122* (2013.01); *B60Q 2300/322* (2013.01); *B60Q 2300/41* (2013.01); *B60Q 2300/42* (2013.01); *B60Q 2300/45* (2013.01); *F21S 41/255* (2018.01); *F21S 41/645* (2018.01);
(Continued)

(58) Field of Classification Search
CPC ......... B60Q 1/085; B60Q 1/122; B60Q 1/143
See application file for complete search history.

(56) References Cited

U.S. PATENT DOCUMENTS 4,861,157 A * 8/1989 Ohama ................. G01C 7/04
352/132
5,526,242 A * 6/1996 Takahashi .............. B60Q 1/122
307/10.1

(Continued)

FOREIGN PATENT DOCUMENTS

DE 19907943 A1 9/2000
DE 10321564 A1 12/2004
(Continued)

OTHER PUBLICATIONS

The extended European Search Report for the related European Patent Application No. 17171316.7 dated Oct. 19, 2017.

*Primary Examiner* — Peter D Le
(74) *Attorney, Agent, or Firm* — Kenealy Vaidya LLP

(57) ABSTRACT

A vehicle lamp is provided, which is capable of changing the clearness of a contrast boundary line correspondingly to a traveling state or a traveling environment of a vehicle. The vehicle lamp is mounted in a vehicle and configured to form a prescribed light distribution pattern including a contrast boundary line, the vehicle lamp including: a sensor provided in the vehicle; and a clearness control unit configured to change clearness of the contrast boundary line correspondingly to a detection result of the sensor.

22 Claims, 16 Drawing Sheets

(51) Int. Cl.
  *B62D 15/02* (2006.01)
  *G06K 9/00* (2006.01)
  *H04N 7/18* (2006.01)
  *H04N 9/31* (2006.01)
  *B60Q 1/14* (2006.01)
  *F21S 41/14* (2018.01)
  *F21S 41/25* (2018.01)
  *F21S 41/36* (2018.01)
  *F21S 41/16* (2018.01)
  F21Y 115/30 (2016.01)
  F21S 41/255 (2018.01)
  F21S 41/64 (2018.01)
  F21S 41/675 (2018.01)
  F21W 102/00 (2018.01)

(52) U.S. Cl.
  CPC ........ *F21S 41/675* (2018.01); *F21W 2102/00* (2018.01); *F21Y 2115/30* (2016.08)

(56) References Cited

U.S. PATENT DOCUMENTS

| | | | | |
|---|---|---|---|---|
| 5,588,733 | A * | 12/1996 | Gotou | B60Q 1/12 315/79 |
| 5,660,454 | A * | 8/1997 | Mori | B60Q 1/085 362/466 |
| 5,896,085 | A * | 4/1999 | Mori | B60Q 1/085 340/469 |
| 6,010,237 | A * | 1/2000 | Gotou | B60Q 1/122 362/460 |
| 6,327,522 | B1 * | 12/2001 | Kojima | B60K 35/00 348/115 |
| 6,343,869 | B1 * | 2/2002 | Kobayashi | B60Q 1/085 362/37 |
| 2001/0026451 | A1 * | 10/2001 | Hasumi | B60Q 1/12 362/466 |
| 2001/0026454 | A1 * | 10/2001 | Komatsu | F21S 41/334 362/487 |
| 2001/0028565 | A1 * | 10/2001 | Ishida | B60Q 1/085 362/464 |
| 2002/0015308 | A1 * | 2/2002 | Naganawa | B60Q 1/12 362/464 |
| 2002/0036907 | A1 * | 3/2002 | Kobayashi | B60Q 1/12 362/464 |
| 2003/0031008 | A1 * | 2/2003 | Kobayashi | B60Q 1/085 362/37 |
| 2004/0136197 | A1 * | 7/2004 | Ishida | F21S 41/143 362/487 |
| 2004/0240219 | A1 * | 12/2004 | Oishi | F21S 41/18 362/487 |
| 2006/0170379 | A1 * | 8/2006 | Uchida | H05B 35/00 315/312 |
| 2011/0025209 | A1 * | 2/2011 | Nakanishi | B60Q 1/12 315/82 |
| 2014/0146175 | A1 * | 5/2014 | Jeon | B60Q 1/1423 348/148 |
| 2015/0292704 | A1 * | 10/2015 | Koshiro | B60Q 1/0041 362/511 |
| 2016/0339833 | A1 * | 11/2016 | Uchida | F21S 41/338 |

FOREIGN PATENT DOCUMENTS

| | | |
|---|---|---|
| DE | 102013216318 A1 | 2/2015 |
| DE | 102014009592 A1 | 12/2015 |
| DE | 102014113478 A1 | 3/2016 |
| EP | 2472176 A2 | 7/2012 |
| JP | 4624257 B2 | 2/2011 |
| JP | 2011-249183 A | 12/2011 |
| JP | 2016-34785 A | 3/2016 |

* cited by examiner

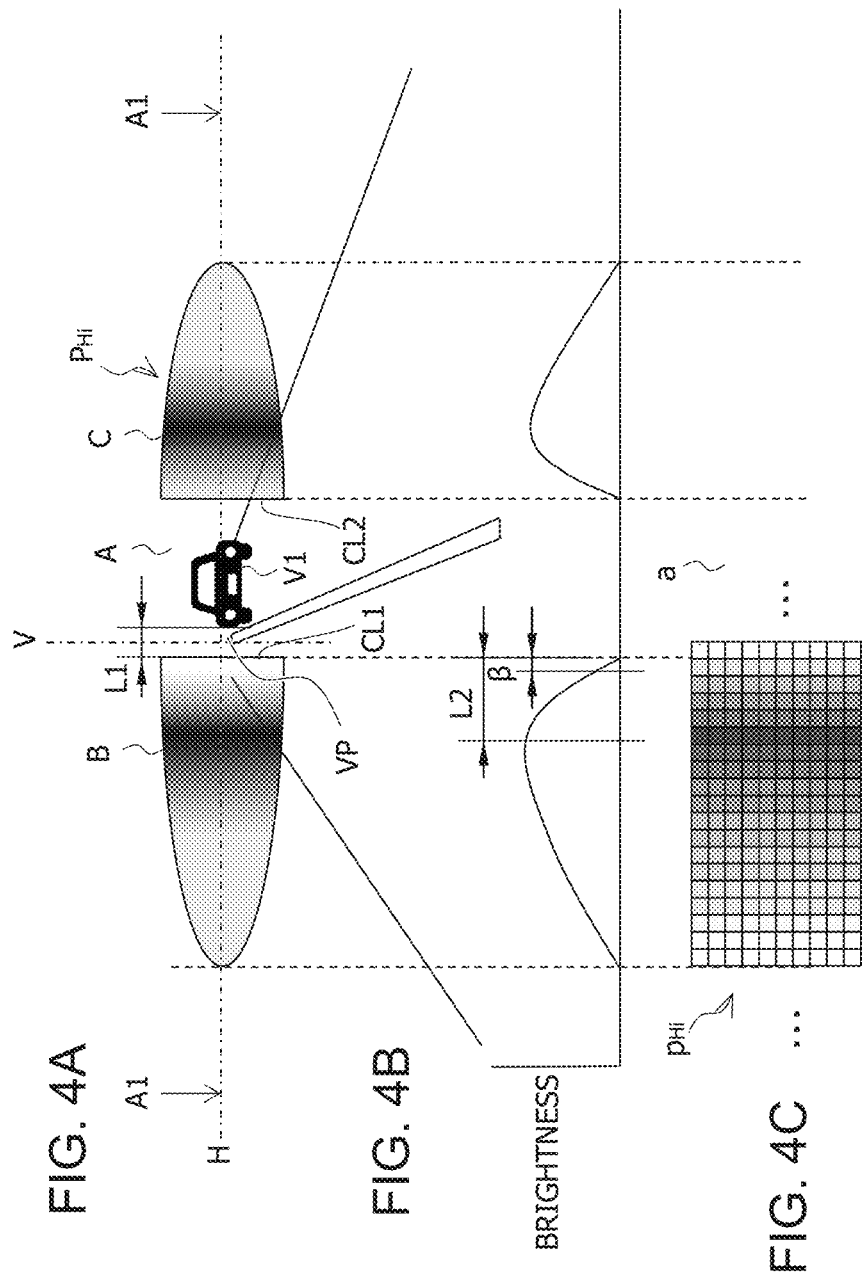

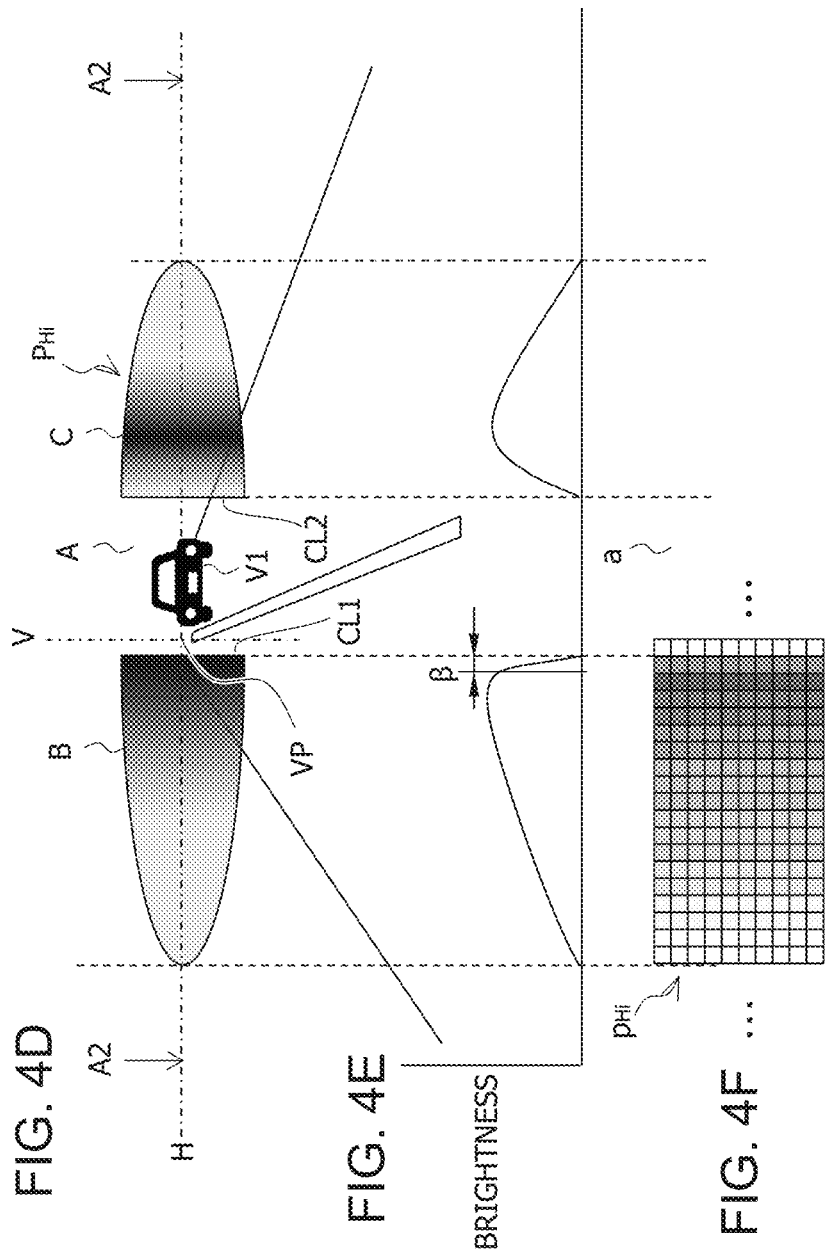

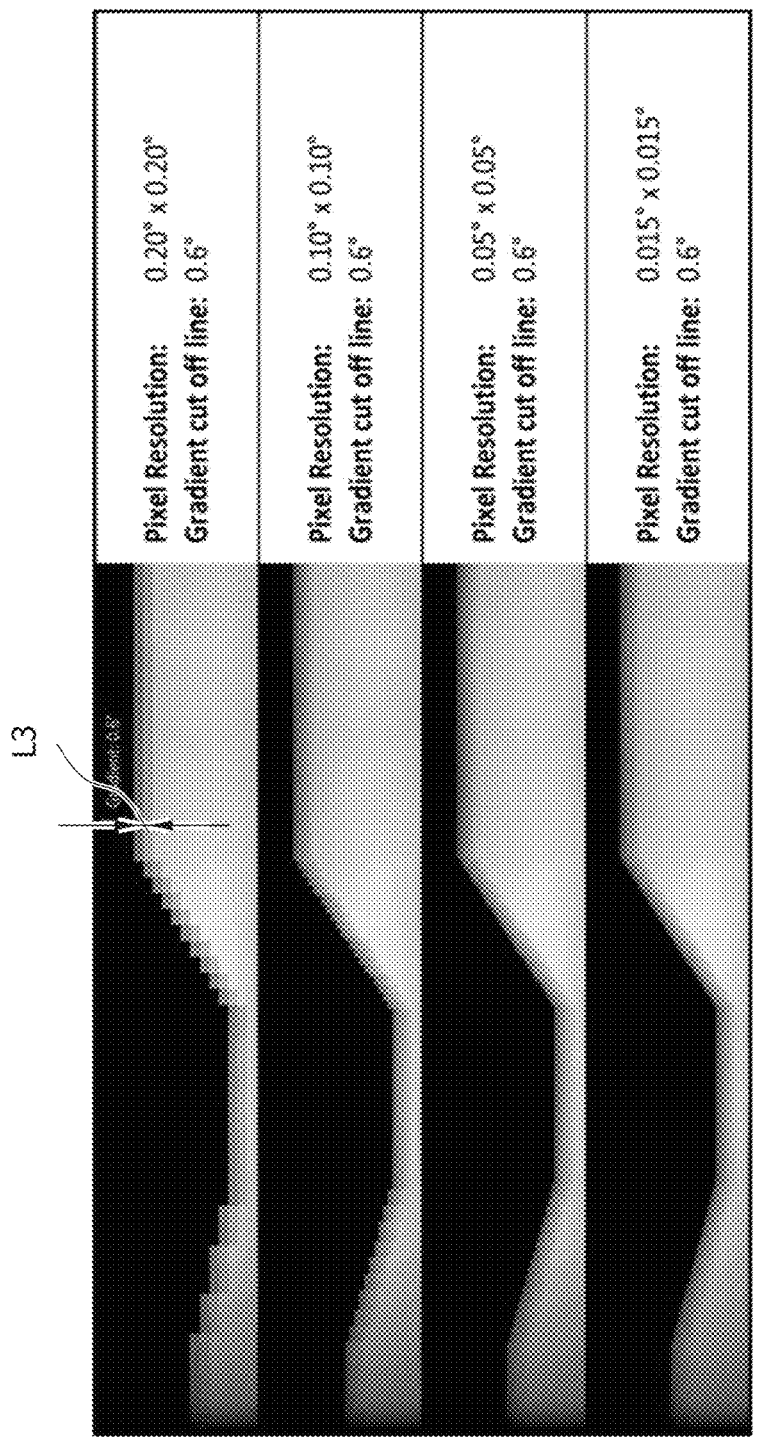

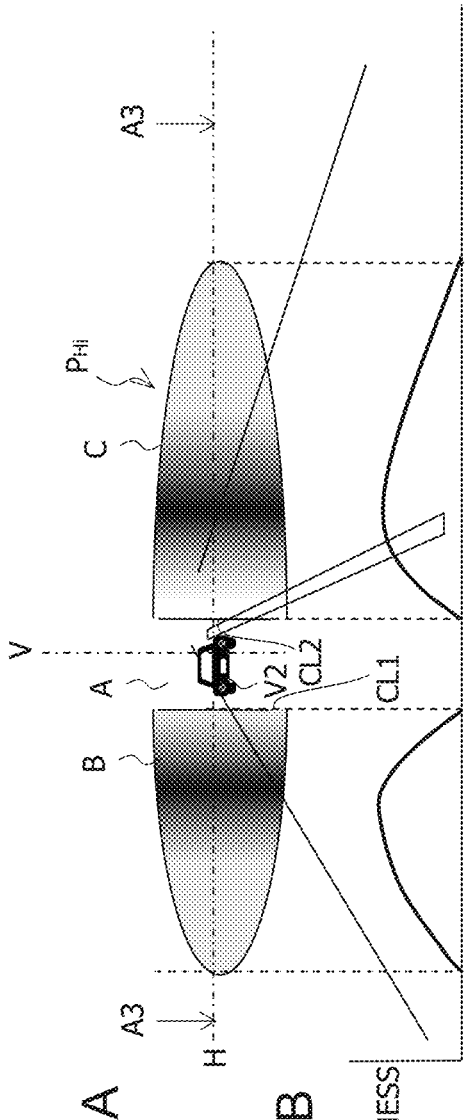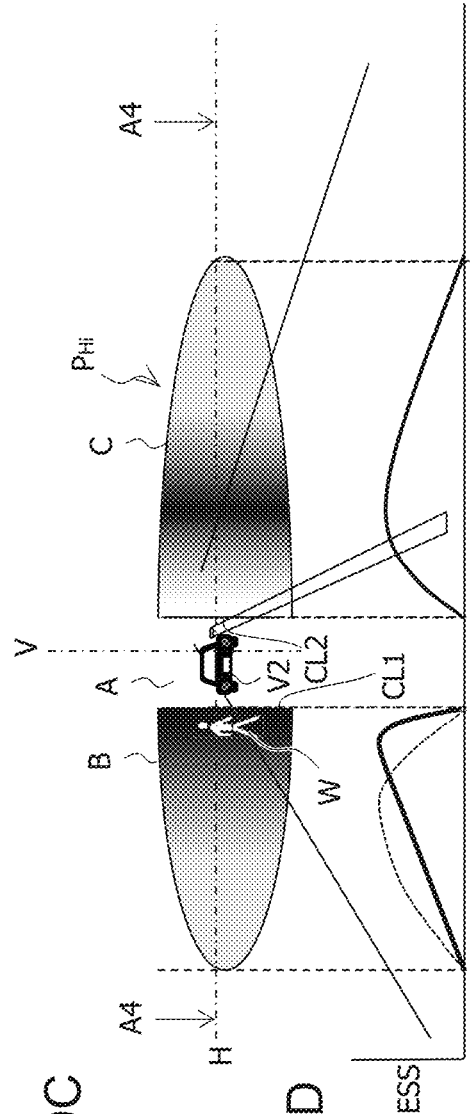

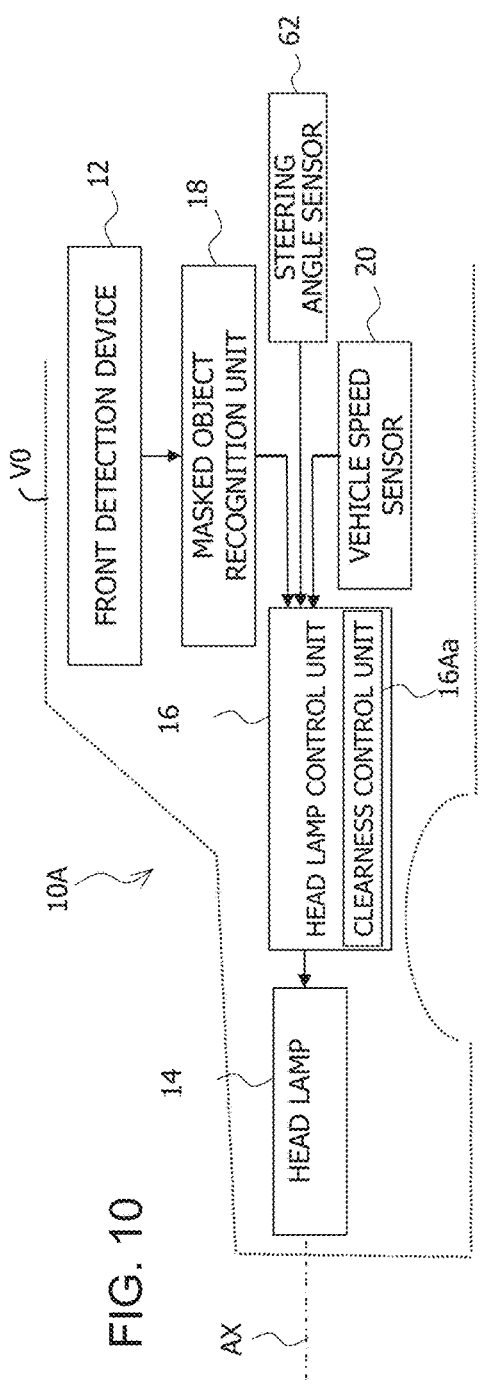
FIG. 10
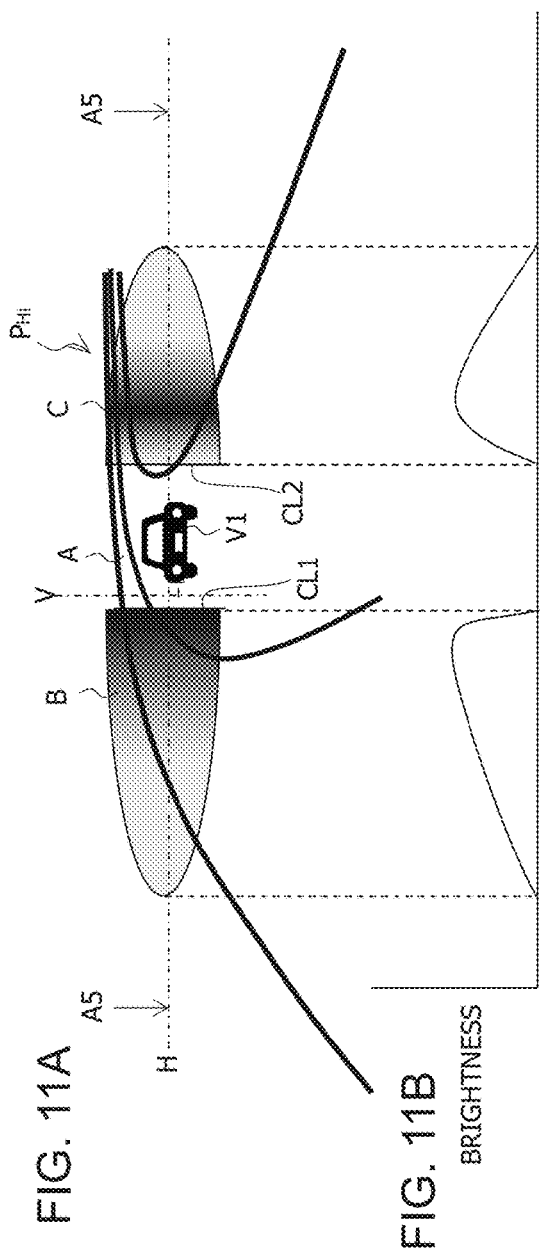
FIG. 11A
FIG. 11B

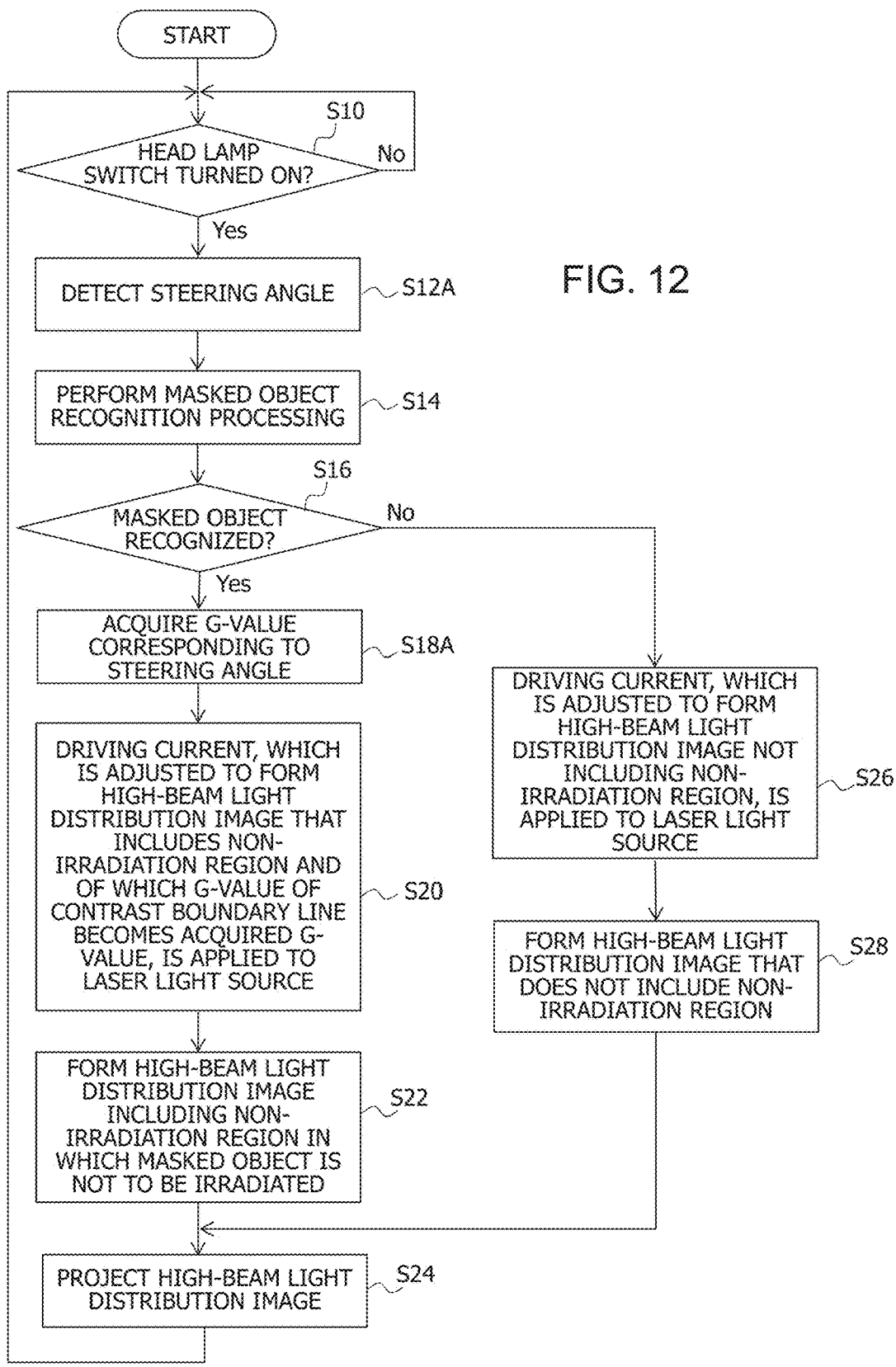

VEHICLE LAMP

CROSS-REFERENCE TO RELATED APPLICATION

This application is based upon and claims the benefit of priority of the prior Japanese Patent Application No. 2016-99024, filed on May 17, 2016, the entire contents of which are incorporated herein by reference.

FIELD

The present invention relates to a vehicle lamp and, in particular, to a vehicle lamp capable of changing the clearness of a contrast boundary line correspondingly to a traveling state or a traveling environment of a vehicle.

BACKGROUND

Conventionally, from the viewpoint of preventing the occurrence of visual discomfort due to a clear contrast boundary line (boundary) between a non-irradiation region (light-shielding region) and an irradiation region, there has been proposed a vehicle lamp capable of providing a contrast boundary line (boundary region) of which the light intensity (brightness) is changed stepwise between a non-irradiation region and an irradiation region (see, for example, Japanese Patent Application Laid-open No. 2016-34785).

SUMMARY

In a vehicle lamp described in Japanese Patent Application Laid-open No. 2016-34785, however, the clearness of a contrast boundary line is constant regardless of the traveling state or the traveling environment of a vehicle in which the vehicle lamp is mounted. Therefore, the vehicle lamp suffers from a problem that safety in nighttime driving may be impaired depending on the traveling state or the traveling environment of the vehicle.

The present invention has been made in view of the above circumstances and has an object of providing a vehicle lamp capable of changing the clearness of a contrast boundary line correspondingly to the traveling state or the traveling environment of a vehicle.

In order to achieve the above object, an aspect of the present invention provides a vehicle lamp mounted in a vehicle and configured to form a prescribed light distribution pattern including a contrast boundary line, the vehicle lamp including: a sensor provided in the vehicle; and a clearness control unit configured to change clearness of the contrast boundary line correspondingly to a detection result of the sensor.

According to the aspect, a vehicle lamp capable of changing the clearness of a contrast boundary line correspondingly to the traveling state or the traveling environment of a vehicle can be provided. As a result, safety in nighttime driving can be improved.

This can be implemented as the clearness of a contrast boundary line can be changed correspondingly to the detection result of a sensor by the operation of a clearness control unit.

Further, in a preferred embodiment of the present invention, the vehicle lamp further includes: a masked object recognition unit configured to recognize a masked object ahead of the vehicle, wherein the prescribed light distribution pattern is a high-beam light distribution pattern including a non-irradiation region in which the masked object recognized by the masked object recognition unit is not to be irradiated and an irradiation region, and the high-beam light distribution pattern includes the contrast boundary line extending in a vertical direction between the non-irradiation region and the irradiation region.

According to the embodiment, a vehicle lamp capable of changing the clearness of a contrast boundary line included in a high-beam light distribution pattern correspondingly to the traveling state or the traveling environment of a vehicle can be provided. As a result, safety in nighttime driving can be improved.

This can be implemented as the clearness of a contrast boundary line can be changed correspondingly to the detection result of a sensor by the operation of a clearness control unit.

Further, in a preferred embodiment of the present invention, the high-beam light distribution pattern includes two contrast boundary lines extending in the vertical direction between the non-irradiation region and the irradiation region, and the clearness control unit changes clearness of at least one of the two contrast boundary lines boundary line correspondingly to the detection result of the sensor.

According to the embodiment, the clearness of at least one of two contrast boundary lines included in a high-beam light distribution pattern can be changed correspondingly to the traveling state or the traveling environment of a vehicle.

Further, in a preferred embodiment of the present invention, when the masked object recognition unit recognizes an oncoming vehicle, which is the masked object, the clearness control unit changes clearness of at least a contrast boundary line on a base vehicle lane side among the two contrast boundary lines correspondingly to the detection result of the sensor.

According to the embodiment, the clearness of at least a contrast boundary line on a base vehicle lane side among two contrast boundary lines included in a high-beam light distribution pattern can be changed correspondingly to the traveling state or the traveling environment of a vehicle.

Further, in a preferred embodiment of the present invention, the sensor is a vehicle speed sensor configured to detect a vehicle speed of the vehicle, and the clearness control unit increases the clearness of the contrast boundary line correspondingly to an increase in the vehicle speed, which is a detection result of the vehicle speed sensor.

According to the embodiment, the clearness of a contrast boundary line can be changed correspondingly to the traveling state (vehicle speed) of a vehicle.

According to the embodiment, the following effects are produced.

First, the clearness of a contrast boundary line can be increased correspondingly to an increase in a vehicle speed, which is the detection result of a vehicle speed sensor. Thus, a visual recognition range can be widened. Further, distance visibility is improved. As a result, safety in nighttime traveling is improved.

Second, the clearness of a contrast boundary line can be decreased correspondingly to a decrease in a vehicle speed, which is the detection result of a vehicle speed sensor. Thus, a contrast boundary line can be caused to appear blurred. As a result, flickering or visual discomfort can be reduced, and the fatigue of a driver of the vehicle can be reduced. As a result, safety in nighttime traveling is improved.

Further, in a preferred embodiment of the present invention, the sensor is a steering angle sensor configured to detect a steering angle of the vehicle, and the clearness control unit increases the clearness of the contrast boundary line correspondingly to an increase in the steering angle, which is a detection result of the steering angle sensor.

According to the embodiment, the clearness of a contrast boundary line can be changed correspondingly to the traveling state (steering speed) of a vehicle.

Further, in a preferred embodiment of the present invention, when the steering angle, which is the detection result of the steering angle sensor exceeds a threshold, the clearness control unit increases the clearness of the contrast boundary line correspondingly to the increase in the steering angle, which is the detection result of the steering angle sensor.

According to the embodiment, when a steering angle does not exceed a threshold (for example, when a vehicle travels along a straight road), the clearness of a contrast boundary line can be prevented from being changed correspondingly to the steering angle, which is the detection result of a steering angle sensor.

Further, in a preferred embodiment of the present invention, the sensor is a navigation device configured to detect a traveling environment of the vehicle, and the clearness control unit changes the clearness of the contrast boundary line correspondingly to the traveling environment of the vehicle, which is a detection result of the navigation device.

According to the embodiment, the clearness of a contrast boundary line can be changed correspondingly to the traveling environment of a vehicle, which is the detection result of a navigation device.

Further, in a preferred embodiment of the present invention, the traveling environment of the vehicle is a curvature of a scheduled traveling road of the vehicle, and the clearness control unit increases the clearness of the contrast boundary line correspondingly to an increase in the curvature of the scheduled traveling road of the vehicle, which is the detection result of the navigation device.

According to the embodiment, the clearness of a contrast boundary line can be changed correspondingly to the traveling environment (the curvature of the scheduled traveling road) of a vehicle, which is the detection result of a navigation device.

Further, in a preferred embodiment of the present invention, the sensor is at least one of a vehicle speed sensor configured to detect a vehicle speed of the vehicle, a steering angle sensor configured to detect a steering angle of the vehicle, and a navigation device configured to detect a traveling environment of the vehicle.

According to the embodiment, the clearness of a contrast boundary line can be changed correspondingly to the detection result of at least one of a vehicle speed sensor, a steering angle sensor, and a navigation device.

Further, in a preferred embodiment of the present invention, the sensor is a sensor configured to detect one of a traveling state and a traveling environment of the vehicle, and the clearness control unit changes the clearness of the contrast boundary line correspondingly to one of the traveling state and the traveling environment of the vehicle, which is the detection result of the sensor.

According to the embodiment, the clearness of a contrast boundary line can be changed correspondingly to the traveling state or the traveling environment of a vehicle, which is the detection result of a sensor.

Further, in a preferred embodiment of the present invention, the clearness is a G-value.

According to the embodiment, the clearness (G-value) of a contrast boundary line can be changed correspondingly to the traveling state or the traveling environment of a vehicle.

BRIEF DESCRIPTION OF DRAWINGS

FIG. 4A illustrates an example of a contrast boundary line CL1 having a relatively low G-value, FIG. 4B illustrates the light intensity distribution of an A1-A1 cross section in FIG. 4A, FIG. 4C illustrates an example of a plurality of pixels constituting a high-beam light distribution pattern $p_{Hi}$ illustrated in FIG. 4A, FIG. 4D illustrates an example of a contrast boundary line CL1 having a relatively high G-value, FIG. 4E illustrates the light intensity distribution of an A2-A2 cross section in FIG. 4D, and FIG. 4F illustrates an example of a plurality of pixels constituting a high-beam light distribution pattern $p_{Hi}$ illustrated in FIG. 4D;

FIGS. 5A to 5D are diagrams for describing a difference (simulation result) in the appearance of the contrast boundary line depending on a difference in resolution;

FIG. 9A illustrates an example of a contrast boundary line CL1 having a relatively low G-value, FIG. 9B illustrates the light intensity distribution of an A3-A3 cross section in FIG. 9A, FIG. 9C illustrates an example of a contrast boundary line CL1 having a relatively high G-value, and FIG. 9D illustrates the light intensity distribution of an A4-A4 cross section in FIG. 9C;

FIG. 10 is a schematic configuration diagram of a vehicle lamp 10A according to a second embodiment;

FIG. 11A illustrates an example of a contrast boundary line CL1 having a relatively high G-value, and FIG. 11B illustrates the light intensity distribution of an A5-A5 cross section in FIG. 11A;

FIG. 12 is a flowchart illustrating an example of processing to change the G-value of the contrast boundary line CL1 correspondingly to a steering angle, which is the detection result of a steering angle sensor 62;

DESCRIPTION OF EMBODIMENTS

Hereinafter, a description will be given of a vehicle lamp 10 according to a first embodiment of the present invention with reference to the accompanying drawings. In each figure, corresponding constituents will be given the same symbols, and their duplicated descriptions will be omitted.

Figure 1:
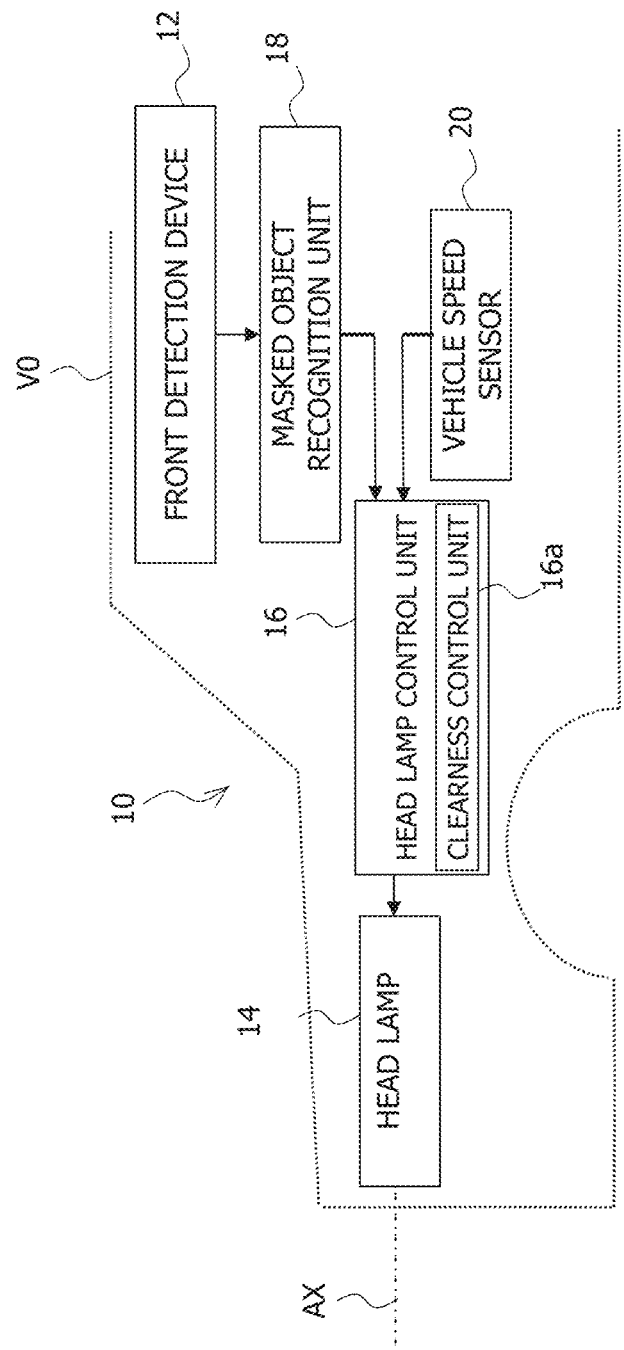
FIG. 1 is a schematic configuration diagram of a vehicle lamp 10 according to a first embodiment.

FIG. 1 is a schematic configuration diagram of the vehicle lamp 10 according to the first embodiment.

As illustrated in FIG. 1, the vehicle lamp 10 of the embodiment is a vehicle lamp that is mounted in a vehicle V0 and configured to form a high-beam light distribution pattern $P_{Hi}$ (see FIG. 4A) including contrast boundary lines CL1 and CL2. The high-beam light distribution pattern corresponds to the prescribed light distribution pattern of the present invention.

Figure 2:
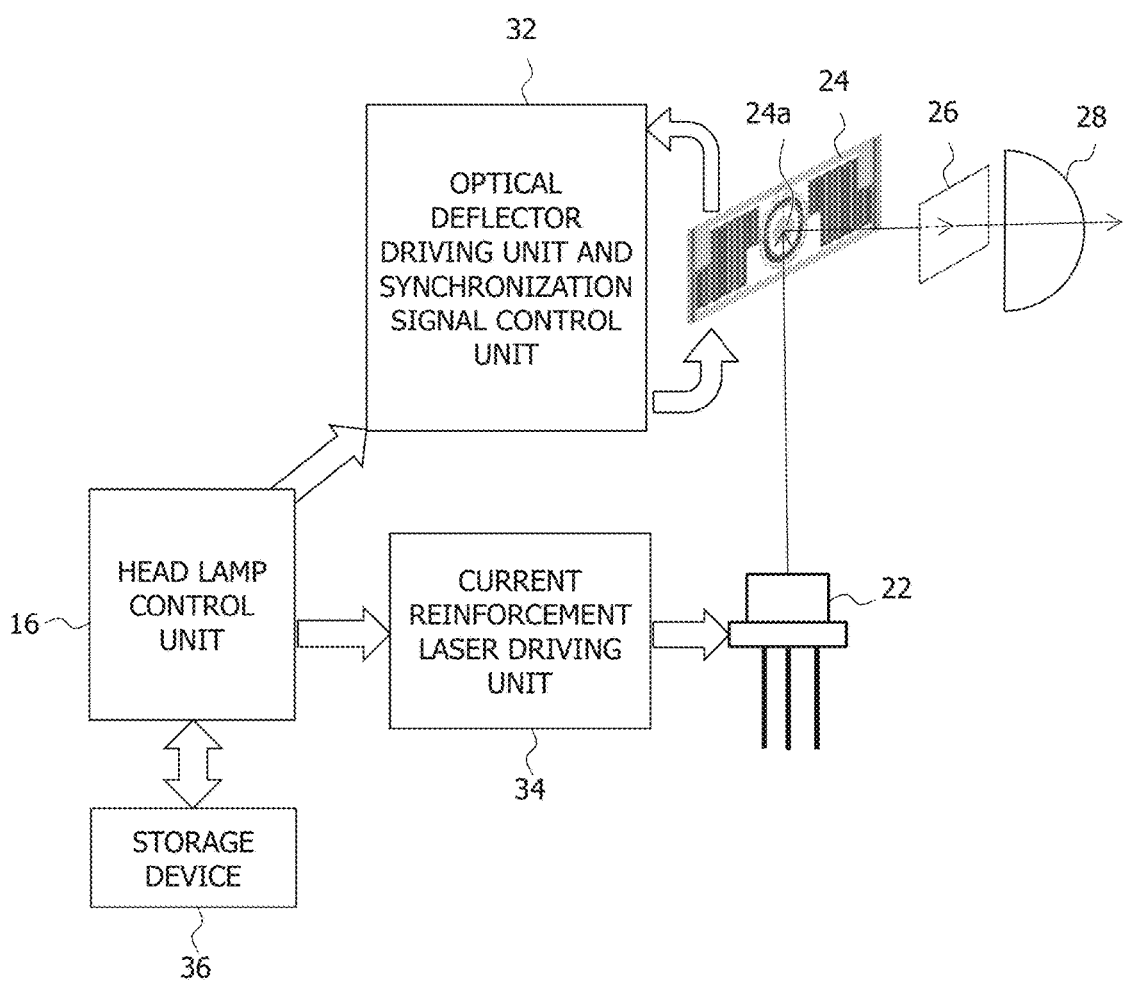
FIG. 2 is a schematic configuration diagram of a head lamp 14.

The vehicle lamp 10 includes a front detection device 12, a head lamp 14, a head lamp control unit 16, a masked object recognition unit 18, a clearness control unit 16a, a vehicle speed sensor 20, or the like. Further, as illustrated in FIG. 2, the vehicle lamp 10 includes a unit 32 composed of an optical deflector driving unit and a synchronization signal control unit, a current reinforcement laser driving unit 34, a storage device 36, or the like.

The front detection device 12, the head lamp 14, the masked object recognition unit 18, the vehicle speed sensor 20, the unit 32 composed of the optical deflector driving unit and synchronization signal control unit, the current reinforcement laser driving unit 34, and the storage device 36 are connected to the head lamp control unit 16. The head lamp control unit 16 controls the head lamp 14 based on an image or the like taken by the front detection device 12.

The front detection device 12 is, for example, a camera (including imaging devices such as CCD sensors and CMOS sensors) that takes an image of the front of the vehicle V0 and provided at the prescribed position of the vehicle V0 (for example, the inside of the vehicle). An image (image data) taken by the front detection device 12 is input to the head lamp control unit 16.

The head lamp control unit 16 includes a CPU such as an image engine CPU.

The masked object recognition unit 18 performs, based on an image (image data) taken by the front detection device 12, masked object recognition processing to recognize a masked object ahead of the vehicle V0 included in the image. The masked object recognition unit 18 is realized, for example, when the head lamp control unit 16 performs a prescribed program stored in the storage device 36. A masked object recognized by the masked object recognition unit 18 is, for example, an oncoming vehicle or a preceding vehicle.

The clearness control unit 16a performs clearness change processing to change the clearness (hereinafter called the G-value) of a contrast boundary line correspondingly to a vehicle speed, which is the detection result of the vehicle speed sensor 20. A contrast boundary line of which the G-value is to be changed by the clearness control unit 16a is at least one of contrast boundary lines CL1 and CL2.

Specifically, the clearness control unit 16a increases the G-value of a contrast boundary line (for example, a contrast boundary line CL1) correspondingly to an increase in a vehicle speed, which is the detection result of the vehicle speed sensor 20. Further, the clearness control unit 16a decreases the G-value of a contrast boundary line (for example, a contrast boundary line CL1) correspondingly to a decrease in a vehicle speed, which is the detection result of the vehicle speed sensor 20. The clearness control unit 16a is realized, for example, when the head lamp control unit 16 performs a prescribed program stored in the storage device 36. Note that a G-value and the operation of the clearness control unit 16a will be described in detail later.

The vehicle speed sensor 20 is a sensor that detects the vehicle speed of the vehicle V0 and provided at the prescribed position of the vehicle V0. The vehicle speed sensor 20 corresponds to a sensor provided in the vehicle of the present invention.

The head lamp 14 is a light distribution variable head lamp (ADB: adaptive driving beam) and provided at the front end of the vehicle V0.

FIG. 2 is a schematic configuration diagram of the head lamp 14.

As illustrated in FIG. 2, the head lamp 14 mainly includes a laser light source 22, an optical deflector 24, a phosphor plate 26, and a projection lens 28.

The laser light source 22 is, for example, a laser diode (LD) that emits the laser light of a blue range. The laser light source 22 is connected to the current reinforcement laser driving unit 34 and controlled by a driving current applied from the current reinforcement laser driving unit 34. The current reinforcement laser driving unit 34 applies a driving current, which is adjusted to form a high-beam light distribution image having a desired light distribution, to the laser light source 22 according to control by the head lamp control unit 16. Laser light from the laser light source 22 is condensed by a condensing lens (not illustrated) and incident on the optical deflector 24 (a mirror unit 24a).

The phosphor plate 26 is a plate-shaped (or layer-shaped) wavelength conversion member having a rectangular outer shape that receives laser light scanned by the optical deflector 24 and converts at least part of the laser light into light (for example, light of a yellow range) having a different wavelength.

The optical deflector 24 is a one-axis resonant and one-axis non-resonant optical deflector (for example, a MEMS scanner) driven by a piezoelectric system and includes the mirror unit 24a (for example, a MEMS mirror) swingably supported about a first axis (resonant driving axis) and a second axis (non-resonant driving axis) orthogonal to the first axis, a first actuator (piezoelectric actuator not illustrated) that reciprocates and swings the mirror unit 24a about the first axis, a second actuator (piezoelectric actuator not illustrated) that reciprocates and swings the mirror unit 24a about the second axis, or the like.

The optical deflector 24 (each actuator) is connected to the unit 32 composed of the optical deflector driving unit and synchronization signal control unit, and controlled by a driving voltage applied from the unit 32 composed of the optical deflector driving unit and synchronization signal control unit. The unit 32 composed of the optical deflector driving unit and synchronization signal control unit applies driving voltages (a driving voltage for resonance driving and a driving voltage for non-resonance driving), which have been adjusted to form a high-beam light distribution image having a desired size, to the optical deflector 24 (each actuator) according to control by the head lamp control unit 16.

Figure 3:
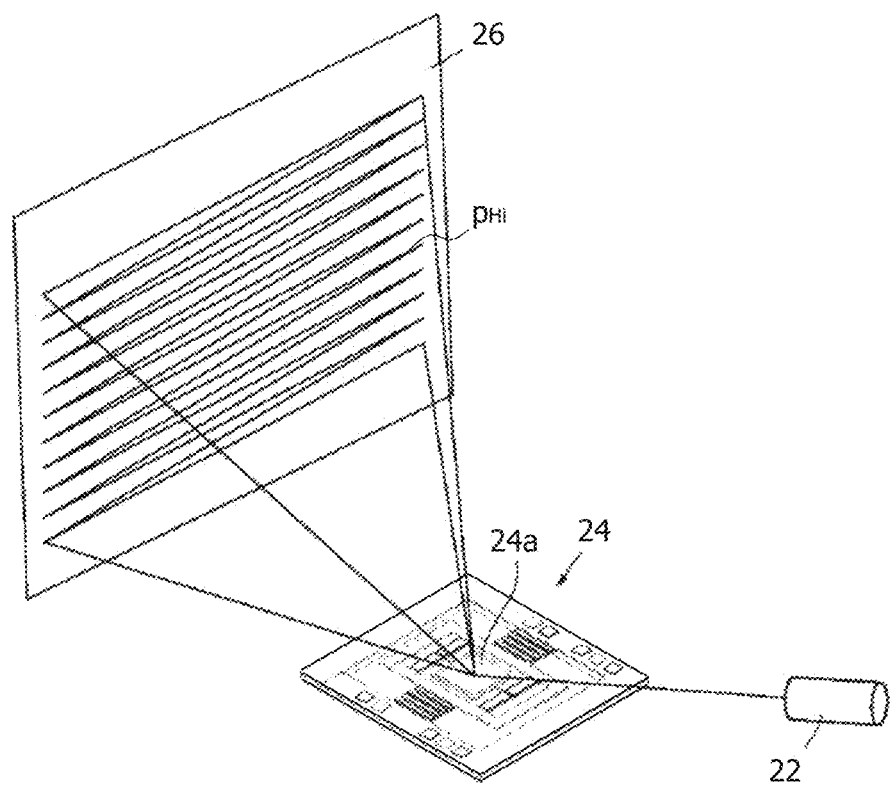
FIG. 3 is a perspective view illustrating a state in which laser light from a laser light source 22 is scanned by an optical deflector 24 (a mirror unit 24a) and a high-beam light distribution image $p_{Hi}$ is formed on a phosphor plate 26.

Thus, the mirror unit 24a reciprocates and swings about each axis and causes laser light from the laser light source 22 modulated in synchronization with the reciprocation and the swinging of the mirror unit 24a to scan in a horizontal direction and a vertical direction as illustrated in, for example, FIG. 3 to form a white (accurately pseudo white) high-beam light distribution image $p_{Hi}$ having a desired light distribution and a desired size in the whole or partial region of the phosphor plate 26. When the high-beam light distribution image $p_{Hi}$ is projected (reversely projected) ahead of the vehicle by the projection lens 28, a high-beam light distribution pattern $P_{Hi}$ is formed as illustrated in FIGS. 4A and 4D.

A high-beam light distribution image $p_{Hi}$ is composed of a plurality of pixels (for example, 640×360 pixels) vertically and horizontally arranged in a lattice pattern (see FIGS. 4C and 4F). Each rectangle in FIG. 4C is an example of each of a plurality of pixels constituting a high-beam light distribution pattern $p_{Hi}$ illustrated in FIG. 4A. Each rectangle in FIG. 4F is an example of each of a plurality of pixels constituting a high-beam light distribution pattern $p_{Hi}$ illustrated in FIG. 4D. Note that FIGS. 4C and 4F illustrate only part of pixel groups for the purpose of illustration.

The brightness (luminescence) of each pixel is separately controlled when a driving current, which is adjusted to form a high-beam light distribution image having a desired light distribution, is applied to the laser light source 22. The size of each pixel is desirably 0.2°×0.2° or less. Thus, a high-beam light distribution image (and a high-beam light distribution pattern) can be formed at higher resolution.

FIGS. 5A to 5D are diagrams for describing a difference (simulation result) in the appearance of a contrast boundary line depending on a difference in resolution. Specifically, FIG. 5A illustrates the appearance of a contrast boundary line when a range (see a range indicated by symbol L3 in FIG. 5A) of 0.6° is composed of pixels having a size of 0.2°×0.2° and its light intensity is changed. FIG. 5B illustrates the appearance of a contrast boundary line when a range of 0.6° is composed of pixels having a size of 0.10°×0.10° and its light intensity is changed. FIG. 5C illustrates the appearance of a contrast boundary line when a range of 0.6° is composed of pixels having a size of 0.05°×0.05° and its light intensity is changed. FIG. 5D illustrates the appearance of a contrast boundary line when a range of 0.6° is composed of pixels having a size of 0.015°×0.015° and its light intensity is changed. Note that FIGS. 5A to 5D are sourced from Proceedings of the 11th International Symposium on Automotive Lighting "BMBF-Project VOLIFA 2020—High resolution light distribution by using a LCD" Representative for the VoLiFa 2020 research cooperation Henrik Hesse, Hella KGaA Hueck & Co., Germany.

By the reference of FIGS. 5A to 5D, it is found that a high-beam light distribution image (and a high-beam light distribution pattern) can be formed at higher resolution when the size of each pixel is set at 0.2°×0.2° or less.

Light (white light, accurately pseudo white light) emitted from each pixel and passing through the projection lens 28 is irradiated in an angular direction (angular range) corresponding to the position of each pixel with respect to a light axis AX (see FIG. 1) extending in the front and rear direction of the vehicle.

For example, light emitted from the reference position (e.g., central position) of the phosphor plate 26 and passing through the projection lens 28 is irradiated in a direction parallel to the light axis AX and directed to the intersection between a horizontal line H and a vertical line V. Further, for example, when the size of each pixel is 0.2°×0.2°, light emitted from pixels adjacent below the reference position and passing through the projection lens 28 is irradiated in an angular range of 0° (upper side) to 0.2° with respect to the light axis AX. Further, for example, light emitted from pixels adjacent at the right of the reference position (at the right toward the front of the vehicle) and passing through the projection lens 28 is irradiated in an angular range of 0° (left side) to 0.2° with respect to the light axis AX. The same applies to light emitted from other pixels and passing through the projection lens 28, and thus the light is irradiated in an angular direction corresponding to the position of each pixel.

As illustrated in FIG. 4A, when the masked object recognition unit 18 recognizes an oncoming vehicle V1 which is a masked object ahead of the vehicle V0, a high-beam light distribution image $p_{Hi}$ including a non-irradiation region a in which the oncoming vehicle V1 which is the masked object is not to be irradiated is formed on the phosphor plate 26 (see FIG. 4C). When the high-beam light distribution image $p_{Hi}$ including the non-irradiation region a is projected (reversely projected) ahead of the vehicle by the projection lens 28, a high-beam light distribution pattern $P_{Hi}$ including a non-irradiation region A in which the oncoming vehicle V1 which is the masked object is not to be irradiated and irradiation regions B and C is formed as illustrated in FIG. 4A.

The size of the non-irradiation region a (and the non-irradiation region A) is set in consideration of a mask margin L1 (see FIG. 4A) such that the masked object is not to be irradiated even if a time until the recognition of the masked object is delayed or an allowable light axis is deviated, for example, between the front detection device 12 and the head lamp 14.

The non-irradiation region a is formed when a driving current, which is adjusted to form the high-beam light distribution image $p_{Hi}$ including the non-irradiation region a in which the masked object is not to be irradiated, is applied to the laser light source 22.

Specifically, the non-irradiation region a is formed when a driving current is applied to the laser light source 22, the driving current having been adjusted such that the light emission intensity of laser light from the laser light source 22 scanned by the optical deflector 24 relatively decreases (that is, the laser light source 22 goes out or dims out) at a timing at which the masked object (non-irradiation region a) is irradiated with the laser light and such that the light emission intensity of the laser light from the laser light source 22 scanned by the optical deflector 24 relatively increases at a timing at which an object other than the masked object (non-irradiation region a) is irradiated with the laser light.

As illustrated in FIG. 4A, the high-beam light distribution pattern $P_{Hi}$ includes two contrast boundary lines CL1 and CL2 extending in a vertical (perpendicular) direction between the non-irradiation region A and the irradiation regions B and C.

The G-values of the contrast boundary lines CL1 and CL2 are calculated by the following formula. Note that a G-value is an index which is the inclination of a contrast boundary line (a change in light intensity).

$$G = (\log E_\beta - \log E_{\beta+0.1°}) \quad [\text{Math. 1}]$$

where $E_\beta$ is a light intensity value at an angular position $\beta$ (see, for example, FIG. 4B).

In automobile lighting, the maximum value of the value of a single contrast boundary line calculated by the above formula is regarded as the G-value of the contrast boundary line. The G-value becomes negative depending on a direction but is generally handled as an absolute value. Note that the contrast boundary line is clearly recognized when G is 0.25 or so but becomes unclear when G is 0.15. The greater the G-value, the higher the clearness becomes.

FIG. 4A is an example of a contrast boundary line CL1 having a relatively low G-value, and FIG. 4D is an example of a contrast boundary line CL1 having a relatively high G-value. FIG. 4B illustrates the light intensity distribution of an A1-A1 cross section in FIG. 4A, and FIG. 4E illustrates the light intensity distribution of an A2-A2 cross section in FIG. 4D.

When compared with the contrast boundary line CL1 (see FIG. 4D) having the relatively high G-value, a first feature of the contrast boundary line CL1 (see FIG. 4A) having the relatively low G-value is that a change in the light intensity (gradient) of the contrast boundary line CL1 is gentler (see FIG. 4B) and thus the contrast boundary line CL1 appears blurred (becomes unclear), and a second feature thereof is that a range in which the light intensity of the contrast boundary line CL1 gently changes is relatively dark (see, for example, a range indicated by symbol L2 in FIG. 4B) and thus, for instance, a visual recognition range becomes narrow.

Conversely, when compared with the contrast boundary line CL1 (see FIG. 4A) having the relatively low G-value, a first feature of the contrast boundary line CL1 (see FIG. 4D) having the relatively high G-value is that a change in the light intensity (gradient) of the contrast boundary line CL1 is steeper (see FIG. 4E) and thus the contrast boundary line CL1 appears clear 8vivid), and a second feature thereof is that the very boundaries between the non-irradiation region A and the irradiation regions B and C become relatively bright (see FIG. 4E) and thus a visual recognition range and distance visibility (distant visual recognition distance) increase, for instance.

Based on the above circumstances, it is desirable to change the G-value of a contrast boundary line (for example, at least one of the contrast boundary lines CL1 and CL2) with a vehicle speed which is the detection result of the vehicle speed sensor 20. For example, it is desirable to increase the G-value of a contrast boundary line correspondingly to an increase in a vehicle speed which is the detection result of the vehicle speed sensor 20. Further, it is desirable to decrease the G-value of a contrast boundary line correspondingly to a decrease in a vehicle speed which is the detection result of the vehicle speed sensor 20. A reason for changing the G-value of a contrast boundary line is as follows.

That is, a contrast boundary line moves as another vehicle (for example, the oncoming vehicle V1) relatively moves with respect to the vehicle V0. At this time, when the contrast boundary line appears clear, the movement of the contrast boundary line is recognized as flickering or visual discomfort, which causes annoyance or fatigue in long time traveling to the driver of the vehicle V0 and may impair safety in nighttime traveling.

From the above reason, a G-value is desirably relatively low from the viewpoint of reducing flickering or visual discomfort.

If a G-value is relatively low, flickering or visual discomfort is reduced but a range in which the light intensity of a contrast boundary line gently changes becomes relatively dark (see, for example, the range indicated by symbol L2 in FIG. 4B) when a vehicle speed is relatively fast. As a result, since a visual recognition range becomes narrow, a naturally viewable area becomes viewless depending on road surface conditions or the like, which may impair safety in nighttime traveling.

In view of this problem, it is desirable to increase the G-value of a contrast boundary line correspondingly to an increase in a vehicle speed which is the detection result of the vehicle speed sensor 20 to widen a visual recognition range. When a visual recognition range is widened as described above, distance visibility (distant visual recognition distance) also increases. Particularly, an area up to the vicinity of a vanishing point VP (intersection between a horizontal line H and a vertical line V) can be made relatively bright when the G-value of a contrast boundary line CL1 positioned on a base vehicle lane side is made relatively high (see FIGS. 4D and 4E) compared with the contrast boundary line CL2.

As a result, distance visibility is greatly improved. In consideration of the fact that a braking distance becomes longer as a vehicle speed is faster, it is advantageous in that early detection of road surface conditions, walkers, bicycles, or the like is made possible. Note that a vehicle body is more stabilized as a vehicle speed is faster. Therefore, even if the G-value of a contrast boundary line is increased, the contrast boundary line does not move as in low speed traveling and thus flickering or visual discomfort is hardly caused.

On the other hand, in consideration of the fact that a braking distance becomes shorter as a vehicle speed is slower, a visual recognition range and distance visibility as in high speed traveling are not required in low speed traveling. Therefore, it is desirable to decrease the G-value of a contrast boundary line (that is, it is desirable to cause the contrast boundary line to appear blurred) correspondingly to a decrease in a vehicle speed which is the detection result of the vehicle speed sensor 20 to reduce flickering or visual discomfort.

Note that a driving current, which is adjusted to make a change in the light intensity (gradient) of a contrast boundary line (for example, the contrast boundary line CL1) steep, is applied to the laser light source 22 to increase the G-value of a contrast boundary line. Similarly, a driving current, which is adjusted to make a change in the light intensity (gradient) of a contrast boundary line (for example, the contrast boundary line CL1) gentle, is applied to the laser light source 22 to decrease the G-value of the contrast boundary line.

Next, a description will be given of an example of processing to change the G-value of a contrast boundary line correspondingly to a vehicle speed which is the detection result of the vehicle speed sensor 20. Hereinafter, a description will be given of an example in which a masked object is the oncoming vehicle V1 and a contrast boundary line of which the G-value is to be changed is a contrast boundary line CL1.

Figure 6:
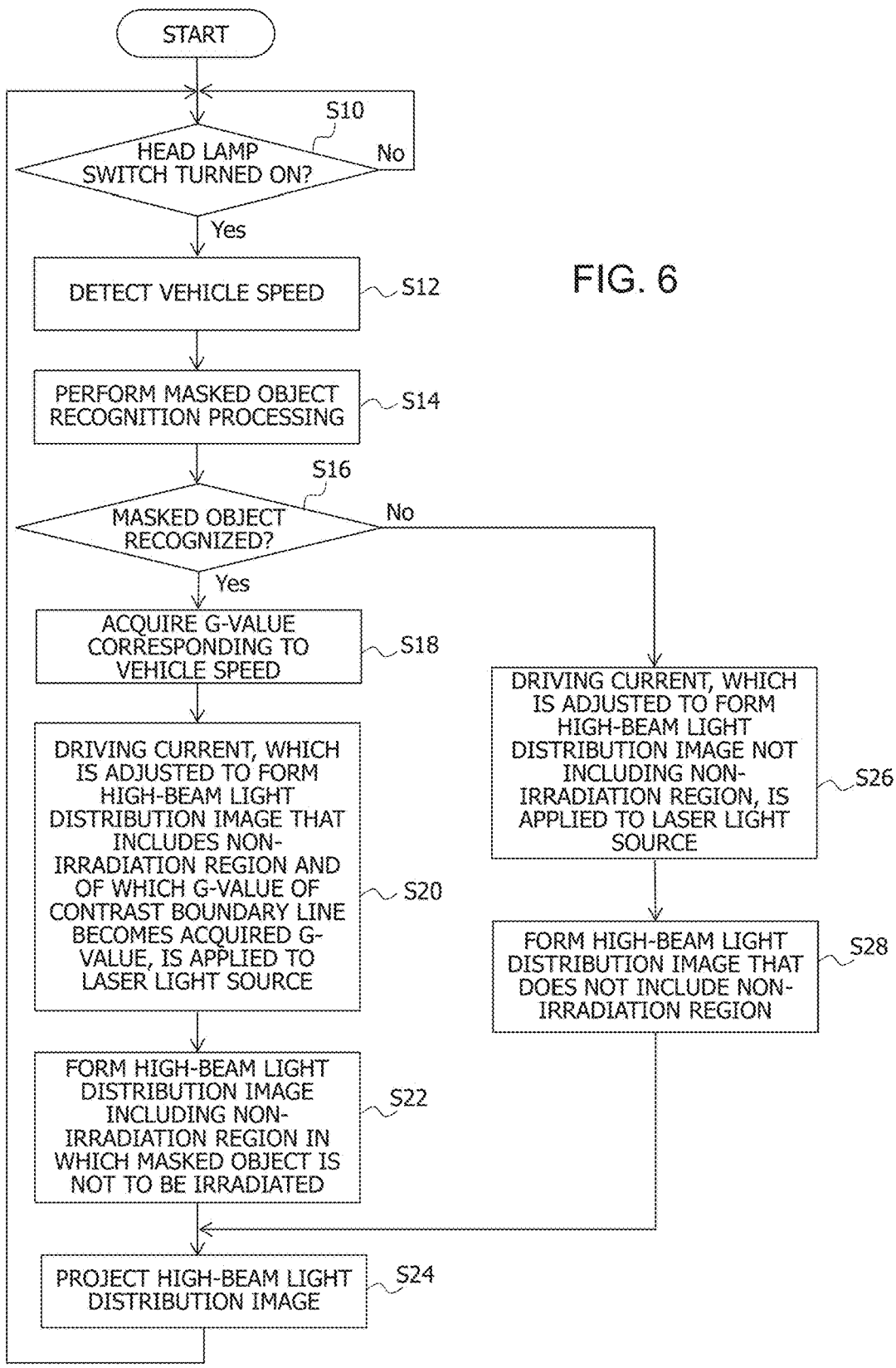
FIG. 6 is a flowchart illustrating an example of processing to change the G-value of the contrast boundary line CL1 with a vehicle speed, which is the detection result of a vehicle speed sensor 20.

FIG. 6 is a flowchart illustrating an example of the processing to change the G-value of a contrast boundary line CL1 with a vehicle speed which is the detection result of the vehicle speed sensor 20.

The following processing is mainly realized when the head lamp control unit 16 performs a prescribed program read from the storage device 36.

The following processing is performed when the vehicle V0 travels along a straight road. Note that a determination as to whether the vehicle V0 travels along a straight road can be made based on a steering angle detected by a steering angle sensor 62 provided in the vehicle V0 that will be described later, road information detected (acquired) by a navigation device 64 provided in the vehicle V0 that will be described later, (and current position information on the vehicle V0 acquired by a GPS (not illustrated) provided in the vehicle V0), or the like.

First, when a head lamp switch (not illustrated) is turned on (step S10: Yes), the vehicle speed sensor 20 detects a vehicle speed (step S12).

Here, it is assumed that a vehicle speed S1 (see FIG. 7) has been detected.

Next, the masked object recognition unit 18 performs, based on an image (image data) taken by the front detection device 12, the masked object recognition processing to recognize a masked object ahead of the vehicle V0 included in the image (step S14).

Then, a determination is made as to whether the masked object has been recognized (step S16). Here, it is assumed that the oncoming vehicle V1 has been recognized as the masked object (step S16: Yes).

Next, the clearness control unit 16a performs the clearness change processing to change the G-value of a contrast boundary line CL1 with a vehicle speed which is the detection result of the vehicle speed sensor 20.

Figure 7:
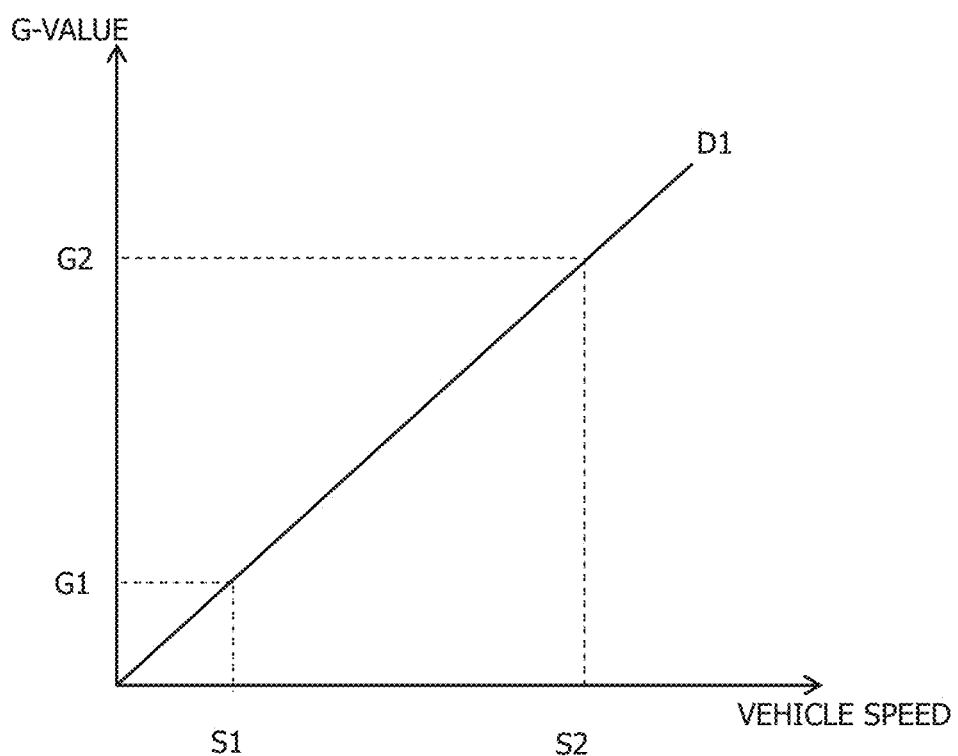
FIG. 7 illustrates an example of the corresponding relationship between the vehicle speed and the G-value.
Figure 8:
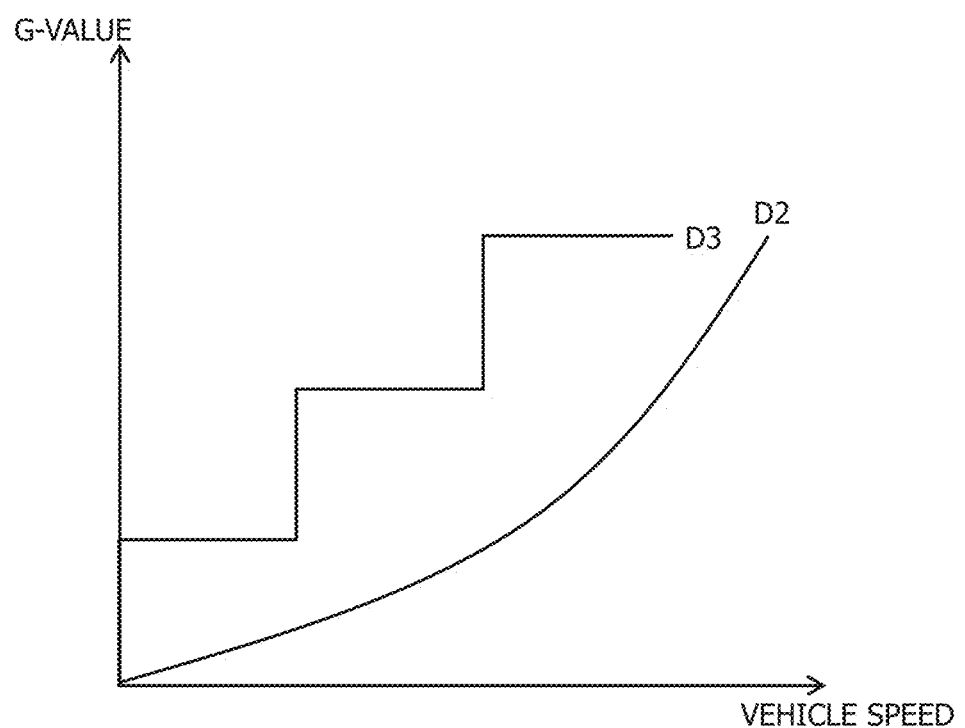
FIG. 8 illustrates another example of the corresponding relationship between the vehicle speed and the G-value.

Specifically, a G-value corresponding to the vehicle speed S1 which is the detection result of the vehicle speed sensor 20 is first acquired (step S18). When the corresponding relationship between a vehicle speed and a G-value as illustrated in, for example, FIG. 7 is stored in the storage device 36, the G-value corresponding to the vehicle speed detected by the vehicle speed sensor 20 is acquired by being read from the storage device 36. Note that the relationship between the vehicle speed and the G-value stored in the storage device 36 is a relationship in which the G-value successively increases in a linear form in proportion to the vehicle speed as, for instance, indicated by symbol D1 in FIG. 7. Of course, not limited to such a relationship, the relationship between the vehicle speed and the G-value stored in the storage device 36 may be any relationship such as a relationship in which the G-value successively increases in a curved form (for example, a quadratic curve form) in proportion to the vehicle speed as indicated by symbol D2 in FIG. 8 and a relationship in which the G-value increases in a staircase pattern in proportion to the vehicle speed as indicated by symbol D3 in FIG. 8.

Here, it is assumed that G1 (see FIG. 7) has been acquired as the G-value corresponding to the vehicle speed S1.

Then, a driving current, which is adjusted to form a high-beam light distribution image $p_{Hi}$ that includes a non-irradiation region a in which the oncoming vehicle V1 which is the masked object is not to be irradiated and of which the G-value of the contrast boundary line CL1 becomes the G-value (here, G1) acquired in step S18, is applied to the laser light source 22 (step S20).

Next, the mirror unit 24a of the optical deflector 24 swings about each axis and causes laser light from the laser light source 22 modulated in synchronization with the swinging of the mirror unit 24a to scan in a horizontal direction and a vertical direction as illustrated in, for example, FIG. 3 to form a white high-beam light distribution image $p_{Hi}$ including the non-irradiation region a, in which the oncoming vehicle V1 which is the masked object recognized in step S14 is not to be irradiated, in the whole or partial region of the phosphor plate 26 (step S22).

When the high-beam light distribution image $p_{Hi}$ is projected (reversely projected) ahead of the vehicle by the projection lens 28 (step S24), a high-beam light distribution pattern $P_{Hi}$ including a non-irradiation region A in which the oncoming vehicle V1 which is the masked object recognized in step S14 is not to be irradiated and irradiation regions B and C is formed as illustrated in FIG. 4A. In this case, the high-beam light distribution pattern $P_{Hi}$ includes the contrast boundary line CL1 of which the G-value is G1.

Thereafter, the processing of steps S12 to S28 is repeatedly performed as long as the head lamp switch (not illustrated) is turned on (step S10: Yes).

That is, when the head lamp switch (not illustrated) is turned on (step S10: Yes), the vehicle speed sensor 20 detects a vehicle speed (step S12).

Here, it is assumed that a vehicle speed S2 (S2>S1, see FIG. 7) has been detected.

Next, the masked object recognition unit 18 performs, based on an image (image data) taken by the front detection device 12, the masked object recognition processing to recognize a masked object ahead of the vehicle V0 included in the image (step S14).

Then, a determination is made as to whether the masked object has been recognized (step S16). Here, it is assumed that the oncoming vehicle V1 has been recognized again as the masked object (step S16: Yes).

Next, the clearness control unit 16a performs the clearness change processing to change the G-value of a contrast boundary line CL1 with a vehicle speed which is the detection result of the vehicle speed sensor 20.

Specifically, a G-value corresponding to the vehicle speed S2 which is the detection result of the vehicle speed sensor 20 is first acquired (step S18).

Here, it is assumed that G2 (G2>G1, see FIG. 7) has been acquired as the G-value corresponding to the vehicle speed S2.

Then, a driving current, which is adjusted to form a high-beam light distribution image $p_{Hi}$ that includes a non-irradiation region a in which the oncoming vehicle V1 which is the masked object is not to be irradiated and of which the G-value of the contrast boundary line CL1 becomes the G-value (here, G2) acquired in step S18, is applied to the laser light source 22 (step S20).

Next, the mirror unit 24a of the optical deflector 24 swings about each axis and causes laser light from the laser light source 22 modulated in synchronization with the swinging of the mirror unit 24a to scan in the horizontal direction and the vertical direction as illustrated in, for example, FIG. 3 to form a white high-beam light distribution image $p_{Hi}$ including the non-irradiation region a, in which the oncoming vehicle V1 which is the masked object recognized in step S14 is not to be irradiated, in the whole or partial region of the phosphor plate 26 (step S22).

When the high-beam light distribution image $p_{Hi}$ is projected (reversely projected) ahead of the vehicle by the projection lens 28 (step S24), the high-beam light distribution pattern $P_{Hi}$ including the non-irradiation region A in which the oncoming vehicle V1 as the masked object recognized in step S14 is not to be irradiated and irradiation regions B and C is formed as illustrated in FIG. 4D. The high-beam light distribution pattern $P_{Hi}$ includes the contrast boundary line CL1 of which the G-value is G2.

Thus, the G-value of a contrast boundary line CL1 can be changed correspondingly to a vehicle speed which is the detection result of the vehicle speed sensor 20. For example, the G-value of a contrast boundary line CL1 can be increased correspondingly to an increase in a vehicle speed which is the detection result of the vehicle speed sensor 20. Further, the G-value of a contrast boundary line CL1 can be decreased correspondingly to a decrease in a vehicle speed which is the detection result of the vehicle speed sensor 20.

Note that when it is determined that the masked object has not been recognized in step S16 (step S16: No), a driving current, which is adjusted to form the high-beam light distribution image $p_{Hi}$ not including the non-irradiation region a, is applied to the laser light source 22 (step S26).

Then, the mirror unit 24a of the optical deflector 24 swings about each axis and causes laser light from the laser light source 22 modulated in synchronization with the swinging of the mirror unit 24a to scan in the horizontal direction and the vertical direction as illustrated in, for example, FIG. 3 to form a white high-beam light distribution image $p_{Hi}$ not including the non-irradiation region a, i.e., the white high-beam light distribution image $p_{Hi}$ of which the whole region is an irradiation region (step S28).

When the high-beam light distribution image $p_{Hi}$ is projected (reversely projected) ahead of the vehicle by the projection lens 28 (step S24), a high-beam light distribution pattern $P_{Hi}$ not including the non-irradiation region A, i.e., the high-beam light distribution pattern $P_{Hi}$ of which the whole region is an irradiation region is formed.

As described above, the embodiment can provide the vehicle lamp 10 capable of changing the G-value of a contrast boundary line (at least one of contrast boundary lines CL1 and CL2) included in a high-beam light distribution pattern $P_{Hi}$ correspondingly to the traveling state (vehicle state) of the vehicle V0. As a result, safety in nighttime traveling can be improved.

This can be implemented as the G-value of a contrast boundary line (at least one of contrast boundary lines CL1 and CL2) can be changed correspondingly to a vehicle speed which is the detection result of the vehicle speed sensor 20 by the operation of the clearness control unit 16a.

Further, the embodiment produces the following effects.

First, the G-value of a contrast boundary line (at least one of contrast boundary lines CL1 and CL2) can be increased correspondingly to an increase in a vehicle speed which is the detection result of the vehicle speed sensor 20. Thus, a visual recognition range can be widened. Further, distance visibility can be improved. As a result, safety in nighttime traveling is improved.

Second, the G-value of a contrast boundary line (at least one of contrast boundary lines CL1 and CL2) can be decreased correspondingly to a decrease in a vehicle speed which is the detection result of the vehicle speed sensor 20. Thus, the contrast boundary line can be caused to appear blurred. As a result, flickering or visual discomfort can be reduced, and the fatigue of the driver of the vehicle V0 can be reduced. As a result, safety in nighttime traveling is improved.

Further, the embodiment can provide a view by which, when the vehicle V0 travels following a preceding vehicle V2 (see FIG. 9A) or crosses the oncoming vehicle V1, for instance (see FIG. 4A), the driver of the vehicle V0 undergoes less stress since the drive is least bothered by the movement of a non-irradiation region A (masked range) to the greatest extent by a contrast boundary line (for example, a contrast boundary line CL1 illustrated in FIG. 4A) that appears blurred (becoming unclear) due to its decreased G-value while maintaining a surrounding brightness feeling.

Next, a description will be given of a modified example.

The first embodiment describes an example in which a contrast boundary line of which the G-value is to be changed is a contrast boundary line CL1. However, the lime is not limited to this and a contrast boundary line of which the G-value is to be changed may, of course, include a contrast boundary line CL2 and both the contrast boundary lines CL1 and CL2. Further, the first embodiment describes an example in which a masked object is the oncoming vehicle V1. However, the object is not limited to this and a masked object may, of course, include the preceding vehicle V2 (see FIG. 9A).

Further, the first embodiment describes an example in which the corresponding relationship between a vehicle speed and a G-value is stored in the storage device 36, a G-value corresponding to a vehicle speed detected by the vehicle speed sensor 20 is acquired by being read from the storage device 36, and a driving current, which is adjusted to set the G-value of a contrast boundary line (for example, a contrast boundary line CL1) at the acquired G-value, is applied to the laser light source 22 to change the G-value of the contrast boundary line correspondingly to a vehicle speed which is the detection result of the vehicle speed sensor 20. However, the configuration is not limited to this and the G-value of a contrast boundary line may be changed in other ways.

For example, it may be possible to store at least one threshold in the storage device 36 or the like and apply a driving current, which is adjusted to make a change in the light intensity (gradient) of a contrast boundary line (for example, a contrast boundary line CL1) steeper than that obtained before the vehicle speed exceeds a threshold, to the laser light source 22 when a vehicle speed detected by the vehicle speed sensor 20 exceeds the threshold to change the G-value of the contrast boundary line with a vehicle speed which is the detection result of the vehicle speed sensor 20.

Further, for example, it may be possible to store at least one threshold in the storage device 36 or the like and apply a driving current, which is adjusted to make a change in the light intensity (gradient) of a contrast boundary line (for example, a contrast boundary line CL1) gentler than that obtained before the vehicle speed falls below a threshold, to the laser light source 22 when a vehicle speed detected by the vehicle speed sensor 20 falls below a threshold to change the G-value of the contrast boundary line with a vehicle speed which is the detection result of the vehicle speed sensor 20.

Next, a description will be given of a vehicle lamp 10A according to a second embodiment of the present invention with reference to the accompanying drawings. In each figure, corresponding constituents will be given the same symbols, and their duplicated descriptions will be omitted.

FIG. 10 is a schematic configuration diagram of the vehicle lamp 10A according to the second embodiment.

As illustrated in FIG. 10, the vehicle lamp 10A of the embodiment is different from the vehicle lamp 10 of the first embodiment in that the steering angle sensor 62 for detecting the steering angle of the vehicle V0 is added.

Further, compared with the first embodiment including the clearness control unit 16a that performs the clearness change processing to change the G-value of a contrast boundary line (at least one of contrast boundary lines CL1 and CL2) with a vehicle speed which is the detection result of the vehicle speed sensor 20, the embodiment is different in that a clearness control unit 16Aa that performs clearness change processing to change the G-value of a contrast boundary line (at least one of contrast boundary lines CL1 and CL2) correspondingly to a steering angle which is the detection result of the steering angle sensor 62 is included. For configurations other than the above configurations, the embodiment is the same as the first embodiment.

When a masked object such as the oncoming vehicle V1 is recognized near a curved road (curve) as illustrated in FIG. 11, it may be needed for the driver to clearly see a traveling direction side. Therefore, in order to more clearly grasp road surface conditions on the traveling direction side, it is desirable to make the light intensity distribution (gradient) of a contrast boundary line (at least a contrast boundary line CL1) steep to widen a visual recognition range.

Further, when a masked object such as the oncoming vehicle V1 is recognized in a curved road (curve) and shielded from light, it may be needed for the driver to clearly see a traveling direction side in the curved road (curve). Therefore, it is desirable for the driver to clearly see a contrast boundary line (at least a contrast boundary line CL1).

Based on the above circumstances, it is desirable to change the G-value of a contrast boundary line (at least one of contrast boundary lines CL1 and CL2) correspondingly to a steering angle which is the detection result of the steering angle sensor 62. For example, it is desirable to increase the G-value of a contrast boundary line correspondingly to an increase in a steering angle which is the detection result of the steering angle sensor 62. Further, it is desirable to decrease the G-value of a contrast boundary line correspondingly to a decrease in a steering angle which is the detection result of the steering angle sensor 62.

Next, a description will be given of an example of processing to change the G-value of a contrast boundary line CL1 correspondingly to a steering angle which is the detection result of the steering angle sensor 62. Hereinafter, a description will be given of an example in which a masked object is the oncoming vehicle V1 and a contrast boundary line of which the G-value is to be changed is a contrast boundary line CL1.

FIG. 12 is a flowchart illustrating an example of processing to change the G-value of a contrast boundary line CL1 correspondingly to a steering angle which is the detection result of the steering angle sensor 62.

In FIG. 12, step S12 to "detect a vehicle speed" in the flowchart of FIG. 6 is replaced by step S12A to "detect a steering angle," and step S18 to "acquire a G-value corresponding to a vehicle speed" is replaced by step S18A to "acquire a G-value corresponding to a steering angle." For steps other than the above steps, the flowchart of FIG. 12 is the same as that of FIG. 6.

Note that when the corresponding relationship between a steering angle and a G-value is stored in the storage device 36 as in, for example, FIG. 7, a G-value corresponding to a steering angle is acquired by reading a G-value corresponding to a steering angle detected by the steering angle sensor 62 from the storage device 36.

Note that when a steering angle which is the detection result of the steering angle sensor 62 exceeds a threshold, the clearness control unit 16Aa desirably increases the clearness of a contrast boundary line correspondingly to an increase in the steering angle which is the detection result of the steering angle sensor 62.

Thus, when a steering angle does not exceed a threshold (for example, when a vehicle travels along a straight road), the G-value of a contrast boundary line can be prevented from being changed correspondingly to the steering angle which is the detection result of the steering angle sensor 62.

As described above, the embodiment can provide the vehicle lamp 10A capable of changing the G-value of a contrast boundary line (at least one of contrast boundary lines CL1 and CL2) included in a high-beam light distribution pattern $P_{Hi}$ correspondingly to the traveling state (steering angle) of the vehicle V0. As a result, safety in nighttime traveling can be improved.

This can be implemented as the G-value of a contrast boundary line (at least one of contrast boundary lines CL1 and CL2) can be changed correspondingly to a steering angle which is the detection result of the steering angle sensor 62 by the operation of the clearness control unit 16Aa.

Further, the embodiment produces the following effects.

First, the G-value of a contrast boundary line (at least one of contrast boundary lines CL1 and CL2) can be increased correspondingly to an increase in a steering angle which is the detection result of the steering angle sensor 62. Thus, a visual recognition range can be widened. Further, distance visibility can be improved. As a result, safety in nighttime traveling is improved.

Second, the G-value of a contrast boundary line (at least one of contrast boundary lines CL1 and CL2) can be decreased correspondingly to a decrease in a steering angle which is the detection result of the steering angle sensor 62. Thus, a contrast boundary line is caused to appear blurred. As a result, flickering or visual discomfort can be reduced, and the fatigue of the driver of the vehicle V0 can be reduced. As a result, safety in nighttime traveling is improved.

Further, according to the embodiment, the G-value of a contrast boundary line (at least one of contrast boundary lines CL1 and CL2) can be changed correspondingly to a vehicle speed which is the detection result of the vehicle speed sensor 20 when a vehicle travels along a straight road, and the G-value of a contrast boundary line (at least one of contrast boundary lines CL1 and CL2) can be changed correspondingly to a steering angle which is the detection result of the steering angle sensor 62 when a vehicle travels along a curved road (curve). Note that the G-value of a contrast boundary line (at least one of contrast boundary lines CL1 and CL2) may be changed correspondingly to both a steering angle which is the detection result of the steering angle sensor 62 and a vehicle speed which is the detection result of the vehicle speed sensor 20 when a vehicle travels along a curved road (curve). Note that a determination as to whether the vehicle V0 travels along a straight road or a curved road (curve) can be made based on a steering angle detected by the steering angle sensor 62 provided in the vehicle V0, road information detected (acquired) by a navigation device 64 provided in the vehicle V0 that will be described later, (current position information on the vehicle V0 acquired by a GPS (not illustrated) provided in the vehicle V0), or the like.

Next, a description will be given of a modified example.

The second embodiment describes an example in which a contrast boundary line of which the G-value is to be changed is a contrast boundary line CL1. However, the line is not limited to this and a contrast boundary line of which the G-value is to be changed may, of course, include a contrast boundary line CL2 and both the contrast boundary lines CL1 and CL2. Further, the second embodiment describes an example in which a masked object is the oncoming vehicle V1. However, the object is not limited to this and a masked object may, of course, include a preceding vehicle.

Further, the second embodiment describes an example in which the corresponding relationship between a steering angle and a G-value is stored in the storage device 36, a G-value corresponding to a steering angle detected by the steering angle sensor 62 is acquired by being read from the storage device 36, and a driving current, which is adjusted to set the G-value of a contrast boundary line (for example, a contrast boundary line CL1) at the acquired G-value, is applied to the laser light source 22 to change the G-value of the contrast boundary line synchronously correspondingly to a steering angle which is the detection result of the steering angle sensor 62. However, the value is not limited to this and the G-value of a contrast boundary line may be changed in other ways.

For example, it may be possible to store at least one threshold in the storage device 36 or the like and apply a driving current, which is adjusted to make a change in the light intensity (gradient) of a contrast boundary line (for example, a contrast boundary line CL1) steeper than that obtained before the steering angle exceeds a threshold, to the laser light source 22 when a steering angle detected by the steering angle sensor 62 exceeds the threshold to change the G-value of the contrast boundary line correspondingly to a steering angle which is the detection result of the steering angle sensor 62.

Further, for example, it may be possible to store at least one threshold in the storage device 36 or the like and apply a driving current, which is adjusted to make a change in the light intensity (gradient) of a contrast boundary line (for example, a contrast boundary line CL1) gentler than that obtained before the steering angle falls below a threshold, to the laser light source 22 when a steering angle detected by the steering angle sensor 62 falls below the threshold to change the G-value of the contrast boundary line correspondingly to a steering angle which is the detection result of the steering angle sensor 62.

Next, a description will be given of a vehicle lamp 10B according to a third embodiment of the present invention with reference to the accompanying drawings. In each figure, corresponding constituents will be given the same symbols, and their duplicated descriptions will be omitted.

Figure 13:
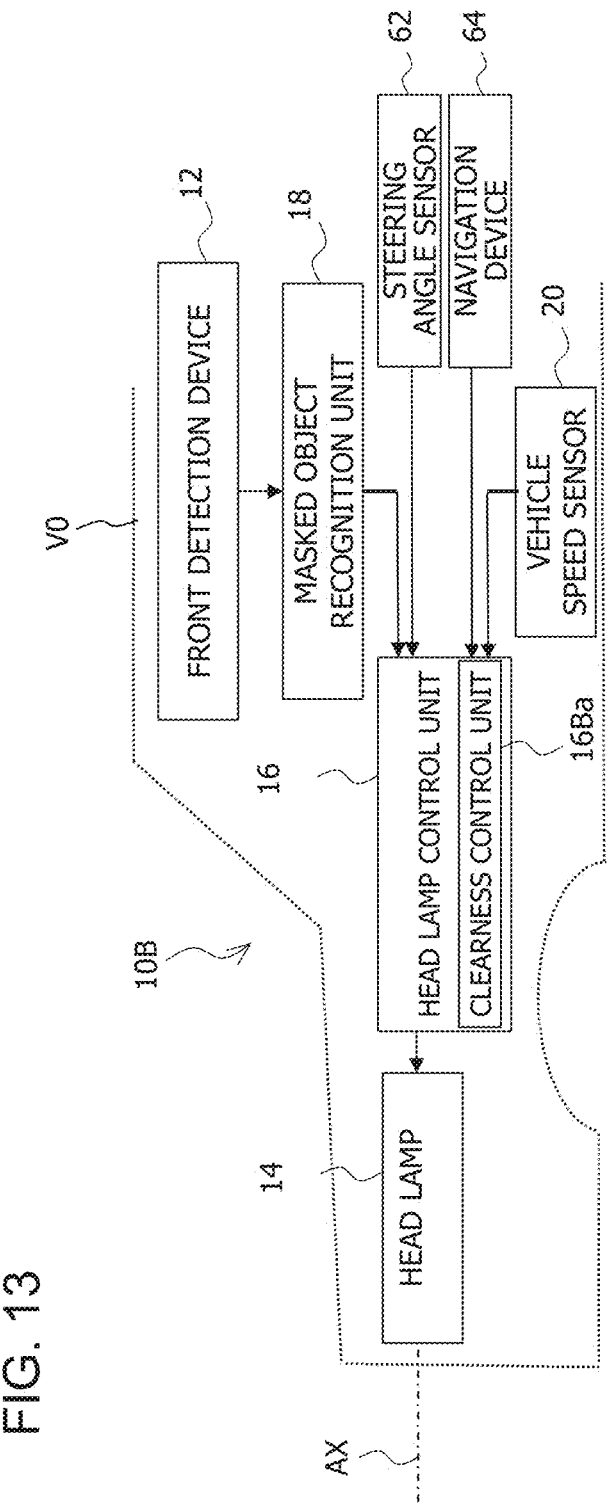
FIG. 13 is a schematic configuration diagram of a vehicle lamp 10B according to a third embodiment.

FIG. 13 is a schematic configuration diagram of the vehicle lamp 10B according to the third embodiment.

As illustrated in FIG. 13, the vehicle lamp 10B of the embodiment is different from the vehicle lamp 10A of the second embodiment in that a navigation device 64 capable of detecting the traveling environment of the vehicle V0 is added.

Further, compared with the second embodiment including the clearness control unit 16Aa that performs the clearness change processing to change the G-value of a contrast boundary line (at least one of contrast boundary lines CL1 and CL2) correspondingly to a steering angle which is the detection result of the steering angle sensor 62, the embodiment is different in that a clearness control unit 16Ba that performs clearness change processing to change the G-value of a contrast boundary line (at least one of contrast boundary lines CL1 and CL2) correspondingly to the traveling environment of the vehicle V0 which is the detection result of the navigation device 64 is included. For configurations other than the above configurations, the embodiment is the same as the second embodiment.

Next, a description will be given of an example of processing to change the G-value of a contrast boundary line CL1 correspondingly to the traveling environment of the vehicle V0 which is the detection result of the navigation device 64. Hereinafter, a description will be given of an example in which the traveling environment of the vehicle V0 detected by the navigation device 64 is the curvature of the scheduled traveling road of the vehicle V0, a masked object is the oncoming vehicle V1, and a contrast boundary line of which the G-value is to be changed is a contrast boundary line CL1.

Figure 14:
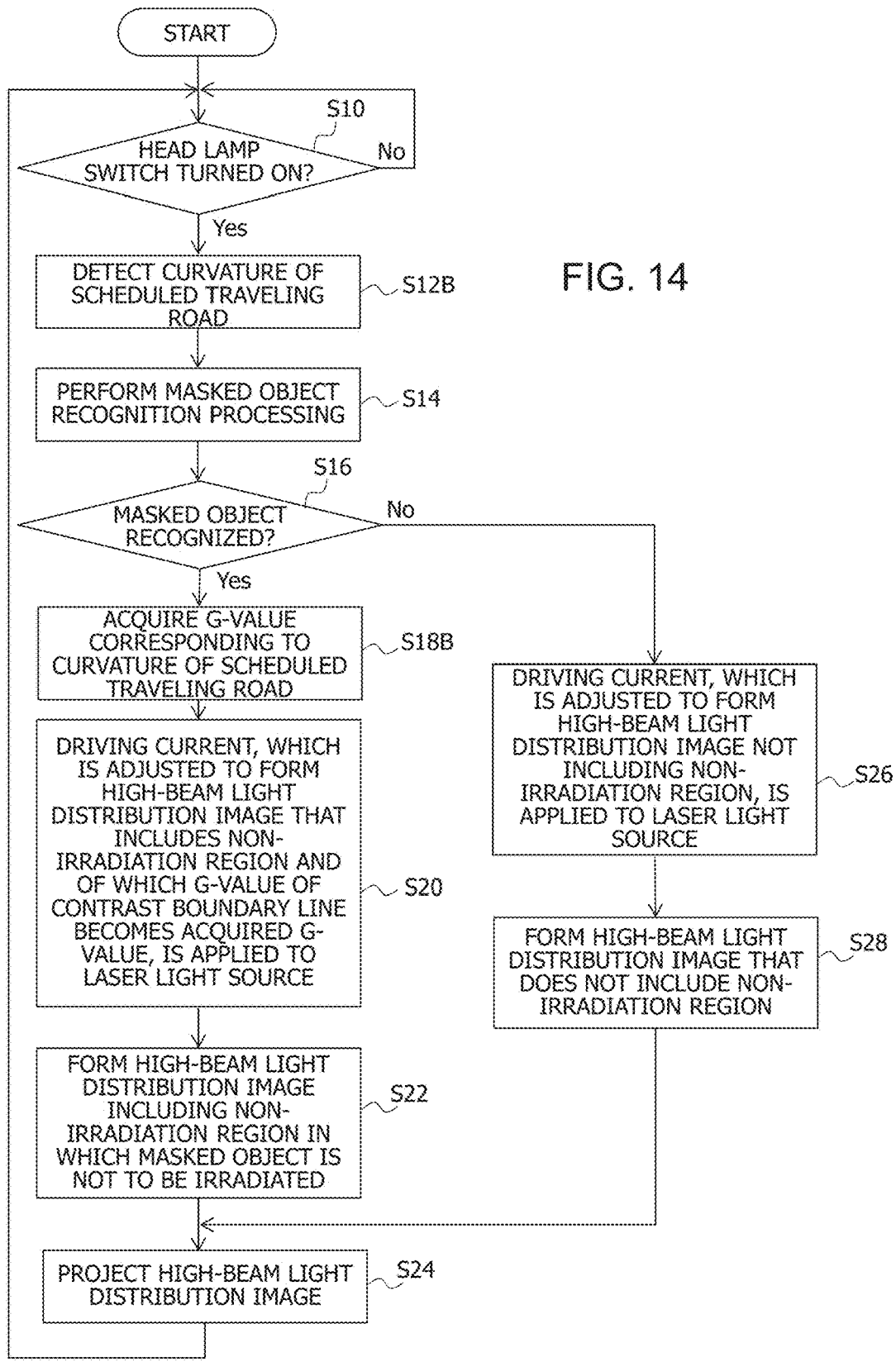
FIG. 14 is a flowchart illustrating an example of processing to change the G-value of a contrast boundary line CL1 correspondingly to the curvature of the scheduled traveling road of a vehicle V0, which is the detection result of a navigation device 64.

FIG. 14 is a flowchart illustrating an example of processing to change the G-value of a contrast boundary line CL1 correspondingly to the curvature of the scheduled traveling road of the vehicle V0 which is the detection result of the navigation device 64.

In FIG. 14, step S12A to "detect a steering angle" in the flowchart of FIG. 12 is replaced by step S12B to "detect a curvature of a scheduled traveling road," and step S18A to "acquire a G-value corresponding to a steering angle" is replaced by step S18B to "acquire a G-value corresponding to a curvature of a scheduled traveling road." For steps other than the above steps, the flowchart of FIG. 14 is the same as that of FIG. 12.

Note that when the corresponding relationship between a curvature and a G-value is stored in the storage device 36 as in, for example, FIG. 7, a G-value corresponding to the curvature of the scheduled traveling road of the vehicle V0 is acquired by reading a G-value corresponding to the curvature of the scheduled traveling road of the vehicle V0 detected by the navigation device 64 from the storage device 36.

As described above, the embodiment may provide the vehicle lamp 10B capable of changing the G-value of a contrast boundary line (at least one of contrast boundary lines CL1 and CL2) included in a high-beam light distribution pattern $P_{Hi}$ correspondingly to the traveling environment (the curvature of the scheduled traveling road) of the vehicle V0. As a result, safety in nighttime traveling may be improved.

This can be implemented as the G-value of a contrast boundary line (at least one of contrast boundary lines CL1 and CL2) can be changed correspondingly to the traveling environment (the curvature of the scheduled traveling road) of the vehicle V0 which is the detection result of the navigation device 64 by the operation of the clearness control unit 16Ba.

Further, the embodiment produces the following effects.

First, the G-value of a contrast boundary line (at least one of contrast boundary lines CL1 and CL2) can be increased correspondingly to an increase in the curvature of the scheduled traveling road of the vehicle V0 which is the detection result of the navigation device 64. Thus, a visual recognition range can be improved. Further, distance visibility can be improved. As a result, safety in nighttime driving is improved.

Second, the G-value of a contrast boundary line (at least one of contrast boundary lines CL1 and CL2) can be decreased correspondingly to a decrease in the curvature of the scheduled traveling road of the vehicle V0 which is the detection result of the navigation device 64. Thus, a contrast boundary line can be caused to appear blurred. As a result, flickering or visual discomfort can be reduced, and the fatigue of the driver of the vehicle V0 can be reduced. As a result, safety in nighttime driving is improved.

Further, according to the embodiment, the G-value of a contrast boundary line (at least one of contrast boundary lines CL1 and CL2) can be changed correspondingly to a vehicle speed which is the detection result of the vehicle speed sensor 20 when a vehicle drives along a straight road, and the G-value of a contrast boundary line (at least one of contrast boundary lines CL1 and CL2) can be changed correspondingly to the curvature of the scheduled traveling road of the vehicle V0 which is the detection result of the navigation device 64 (and a steering angle which is the detection result of the steering angle sensor 62) when the vehicle drives along a curved road (curve). Note that the G-value of a contrast boundary line (at least one of contrast boundary lines CL1 and CL2) can be changed correspondingly to both the curvature of the scheduled traveling road of the vehicle V0 which is the detection result of the navigation device 64 (and a steering angle which is the detection result of the steering angle sensor 62) and a vehicle speed which is the detection result of the vehicle speed sensor 20 when the vehicle drives along a curved road (curve).

Next, a description will be given of a modified example.

The third embodiment describes an example in which a contrast boundary line of which the G-value is to be changed is a contrast boundary line CL1. However, the line is not limited to this and a contrast boundary line of which the G-value is to be changed may, of course, include a contrast boundary line CL2 and both the contrast boundary lines CL1 and CL2. Further, the third embodiment describes an example in which a masked object is the oncoming vehicle V1. However, the object is not limited to this and a masked object may, of course, include a preceding vehicle.

Further, the third embodiment describes an example in which the corresponding relationship between a curvature and a G-value is stored in the storage device 36, a G-value corresponding to the curvature of the scheduled traveling road of the vehicle V0 detected by the navigation device 64 is acquired by being read from the storage device 36, and a driving current, which is adjusted to set the G-value of a contrast boundary line (for example, a contrast boundary line CL1) at the acquired G-value, is applied to the laser light source 22 to change the G-value of the contrast boundary line correspondingly to the curvature of the scheduled traveling road of the vehicle V0 which is the detection result of the navigation device 64. However, the value is not limited to this and the G-value of a contrast boundary line may be changed in other ways.

For example, it may be possible to store at least one threshold in the storage device 36 or the like and apply a driving current, which is adjusted to make a change in the light intensity (gradient) of a contrast boundary line (for example, a contrast boundary line CL1) steeper than that obtained before the curvature exceeds a threshold, to the laser light source 22 when the curvature of the scheduled traveling road of the vehicle V0 detected by the navigation device 64 exceeds the threshold to change the G-value of the contrast boundary line correspondingly to the curvature of the scheduled traveling road of the vehicle V0 which is the detection result of the navigation device 64.

Further, for example, it may be possible to store at least one threshold in the storage device 36 or the like and apply a driving current, which is adjusted to make a change in the light intensity (gradient) of a contrast boundary line (for example, a contrast boundary line CL1) gentler than that obtained before the curvature falls below a threshold, to the laser light source 22 when the curvature of the scheduled traveling road of the vehicle V0 detected by the navigation device 64 falls below a threshold to change the G-value of the contrast boundary line correspondingly to the curvature of the scheduled traveling road of the vehicle V0 which is the detection result of the navigation device 64.

Further, the third embodiment describes an example in which the traveling environment of the vehicle V0 which is the detection result of the navigation device 64 is the curvature of the scheduled traveling road of the vehicle V0. However, the environment is not limited to this and the traveling environment of the vehicle V0 which is the detection result of the navigation device 64 may be the road surface condition of the scheduled traveling road or the currently traveling road of the vehicle V0.

For example, when the traveling environment (the road surface condition of the scheduled traveling road or the currently traveling road) of the vehicle V0 which is the detection result of the navigation device 64 is a paved road, the G-value of a contrast boundary line (at least one of contrast boundary lines CL1 and CL2) is made relatively high. On the other hand, when the traveling environment (the road surface condition of the scheduled traveling road or the currently traveling road) of the vehicle V0 which is the detection result of the navigation device 64 is an unpaved road, the G-value of a contrast boundary line (at least one of contrast boundary lines CL1 and CL2) is made relatively low.

As described above, the G-value of a contrast boundary line (at least one of contrast boundary lines CL1 and CL2) included in a high-beam light distribution pattern $P_{Hi}$ is changed correspondingly to the traveling condition (the road surface condition of the scheduled traveling road or the currently traveling road) of the vehicle V0 which is the detection result of the navigation device 64, whereby dazzling light can be prevented from being irradiated on a masked object when the vehicle V0 travels along an unpaved road.

Next, a description will be given of a modified example common to each of the embodiments.

Each of the embodiments describes an example in which a camera is used as the front detection device 12, but the device is not limited to this. For example, a radar device (for example, a millimeter wave radar and an infrared laser radar) may be used as the front detection device 12. These devices may be used singly or in combination.

Further, each of the embodiments describes an example in which the vehicle speed sensor 20, the steering angle sensor 62, or the navigation device 64 is used as a sensor provided in the vehicle V0, but the sensor is not limited this. For example, a sensor that detects walkers, bicycles, or the like ahead of the vehicle V0 such as the front detection device 12 may be used as a sensor provided in vehicle V0. These devices may be used singly or in combination. Note that the vehicle speed sensor 20 or the steering angle sensor 62 corresponds to a sensor that detects the traveling state of the vehicle of the present invention. Further, the navigation device 64 or a sensor that detects walkers, bicycles, or the like ahead of the vehicle V0 corresponds to a sensor that detects the traveling environment of the vehicle of the present invention.

When a sensor that detects walkers, bicycles, or the like ahead of the vehicle V0 is used as a sensor provided in the vehicle V0, the G-value of a contrast boundary line (a contrast boundary line CL1 in this case) positioned in the direction of a walker W (see FIG. 9D) detected by the sensor is, for example, increased to widen a visual recognition range, whereby the recognition of the walker W or the like ahead of the vehicle V0 can be assisted.

Further, each of the embodiments describes an example in which a laser diode that emits the laser light of a blue range is used as the laser light source 22 and a wavelength conversion member that receives laser light from the laser light source 22 and converts at least part of the laser light into light (for example, the light of a yellow range) having a different wavelength is used as the phosphor plate 26, but the member is not limited to this.

For example, a laser diode that emits the laser light of a near-ultraviolet range may be used as the laser light source 22, and a wavelength conversion member that receives laser light from the laser light source 22 and converts at least part of the laser light into the light (for example, the light of the three colors of red, green, and blue) having a different wavelength may be used as the phosphor plate 26. In this case, when the laser light of a near-ultraviolet range from the laser light source 22 is scanned by the optical deflector 24, a white high-beam light distribution image $p_{Hi}$ is formed on the phosphor plate 26. When the high-beam light distribution image $p_{Hi}$ is projected (reversely projected) ahead of the vehicle by the projection lens 28, a high-beam light distribution pattern $P_{Hi}$ is formed.

Further, for example, a white light source (for example, a white laser light source) may be used instead of the laser light source 22, and a diffusion plate (not illustrated) may be used instead of the phosphor plate 26. In this case, when white light from the white light source is scanned by the optical deflector 24, a white high-beam light distribution image $p_{Hi}$ is formed on the diffusion plate. When the high-beam light distribution image $p_{Hi}$ is projected (reversely projected) ahead of the vehicle by the projection lens 28, a high-beam light distribution pattern $P_{Hi}$ is formed.

Further, each of the embodiments describes an example in which an optical deflector driven by a piezoelectric system is used as the optical deflector 24, but the optical deflector is not limited to this. For example, an optical deflector driven by an electrostatic system, an electromagnetic system, or other systems may be used as the optical deflector 24.

Further, each of the embodiments describes an example in which a one-axis resonant and one-axis non-resonant optical deflector is used as the optical deflector 24, but the optical deflector is not limited to this. For example, a two-axis non-resonant and two-axis resonant optical deflector may be used as the optical deflector 24.

Further, each of the embodiments describes an example in which a head lamp including the optical deflector 24 is used as the head lamp 14, but the head lamp is not limited to this.

For example, a head lamp 14A including a DMD 46 (DMD: digital mirror device) may be used as the head lamp 14.

Figure 15:
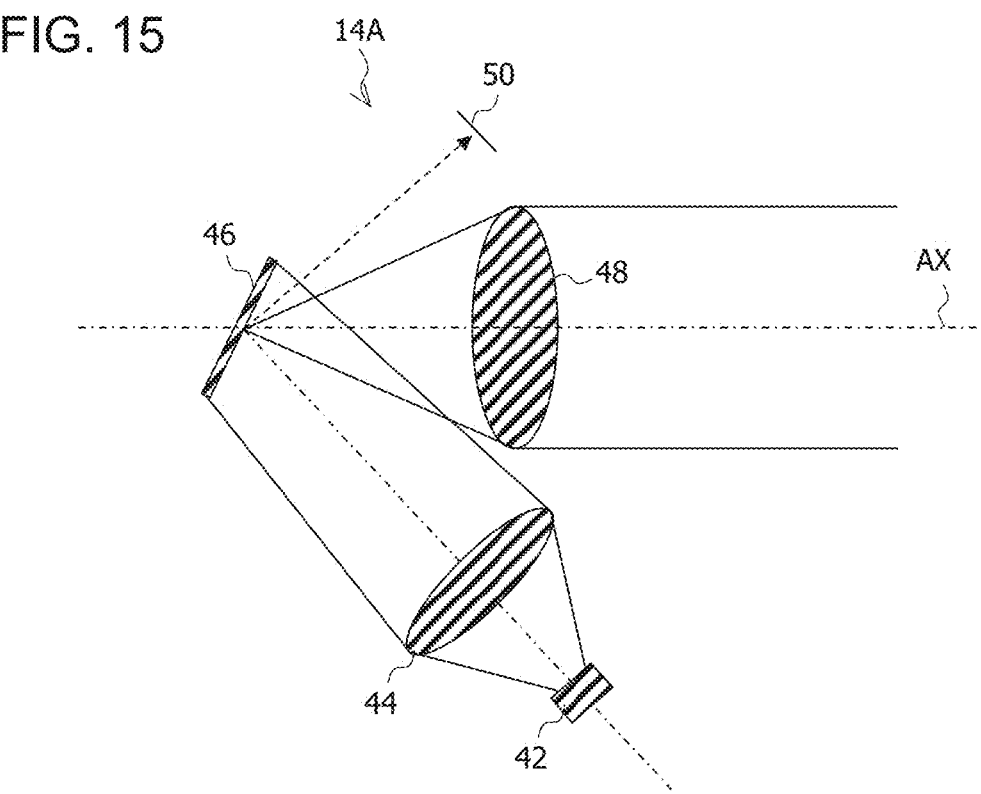
FIG. 15 illustrates an example of a head lamp 14A including a DMD 46.

FIG. 15 is an example of the head lamp 14A including the DMD 46.

As illustrated in FIG. 15, the head lamp 14A including the DMD 46 of the modified example includes a light source 42 (a white light source such as a white LED and a white LD), a condensing lens 44, the DMD 46, a projection lens 48, an undesired light absorber 50, or the like.

The DMD 46 includes a plurality of micro mirrors (not illustrated) arranged in an array shape. Light from the light source 42 condensed by the condensing lens 44 is incident on the plurality of micro mirrors. Light reflected by an on-position micro mirror among the plurality of micro mirrors is incident on the projection lens 48 and passes through the projection lens to be irradiated ahead of the vehicle V0. On the other hand, light reflected by an off-position micro mirror among the plurality of micro mirrors is incident on and absorbed by the undesired light absorber 50. The brightness of each pixel is separately controlled when a cycle at which each micro mirror is turned on/off is separately controlled. The size of each pixel (pixel size) is desirably 0.2°×0.2° or less. Thus, a high-beam light distribution image (and a high-beam light distribution pattern) can be formed at higher resolution. Since a head lamp including a DMD is described in detail in Japanese Patent Application Laid-open No. 2016-34785, Japanese Patent Application Laid-open No. 2004-210125, or the like, its further descriptions will be omitted.

According to the head lamp 14A (the DMD 46) having the above configurations, a white high-beam light distribution image including a non-irradiation region in which a masked object is not to be irradiated can be formed like the head lamp 14 (the optical deflector 24) when each micro mirror is separately turned on/off. Further, a high-beam light distribution pattern like those illustrated in FIGS. 4A and 4D can be formed when the high-beam light distribution image is projected (reversely projected) ahead of a vehicle by the projection lens 48.

At this time, the G-value of a contrast boundary line can be changed like the head lamp 14 (the optical deflector 24) when a cycle at which each micro mirror is turned on/off is separately adjusted correspondingly to the detection result of each sensor (for example, the vehicle speed sensor 20, the steering angle sensor 62, or the navigation device 64).

With the head lamp 14A including the DMD 46 of the modified example, the same effects as those of each of the embodiments can also be produced.

Further, for example, a head lamp 14B including a LCD 58 (LCD: liquid crystal display) may be used as the head lamp 14.

Figure 16:
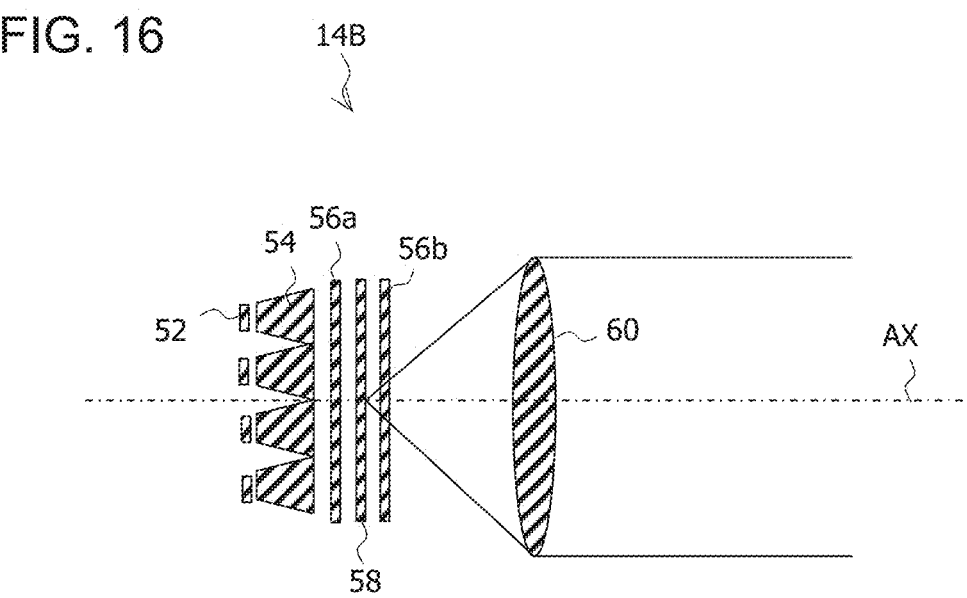
FIG. 16 illustrates an example of a head lamp 14B including a LCD 58.

FIG. 16 is an example of the head lamp 14B including the LCD 58.

As illustrated in FIG. 16, the head lamp 14B including the LCD 58 of the modified example includes a light source 52 (a white light source such as a white LED and a white LD), a condensing optical system 54, two polarizing plates 56a and 56b with their polarizing axes orthogonal to each other, the LCD 58 (LCD element) arranged between the two polarizing plates 56a and 56b, a projection lens 60, or the like.

Light from the light source 52 shaped by the condensing optical system 54 is incident on the LCD 58 in which the polarizing direction of each pixel (not illustrated) is separately controlled. The transmission amount of light passing through each pixel is determined depending on the relationship between the polarizing directions of the polarizing plates 56a and 56b and the polarizing direction of light polarized by each pixel of the LCD 58. The brightness of each pixel is separately controlled when the polarizing direction of each pixel is separately controlled. The size of each pixel (pixel size) is desirably 0.2°×0.2° or less. Thus, a high-beam light distribution image (and a high-beam light distribution pattern) can be formed at higher resolution. Since a head lamp including a LCD is described in detail in Japanese Patent Application Laid-open No. H1-244934, Japanese Patent Application Laid-open No. 2005-183327, or the like, its further descriptions will be omitted.

According to the head lamp 14B (the LCD 58) having the above configurations, a white high-beam light distribution image including a non-irradiation region in which a masked object is not to be irradiated can be formed like the head lamp 14 (the optical deflector 24) when the polarizing direction of each pixel is separately controlled. Further, a high-beam light distribution pattern like those illustrated in FIGS. 4A and 4D can be formed when the high-beam light distribution image is projected (reversely projected) ahead of a vehicle by the projection lens 60.

At this time, the G-value of a contrast boundary line can be changed like the head lamp 14 (the optical deflector 24) when the polarizing direction of each pixel is separately adjusted correspondingly to the detection result of each sensor (for example, the vehicle speed sensor 20, the steering angle sensor 62, or the navigation device 64).

With the head lamp 14B including the LCD 58 of the modified example, the same effects as those of each of the embodiments can also be produced.

Figure 17:
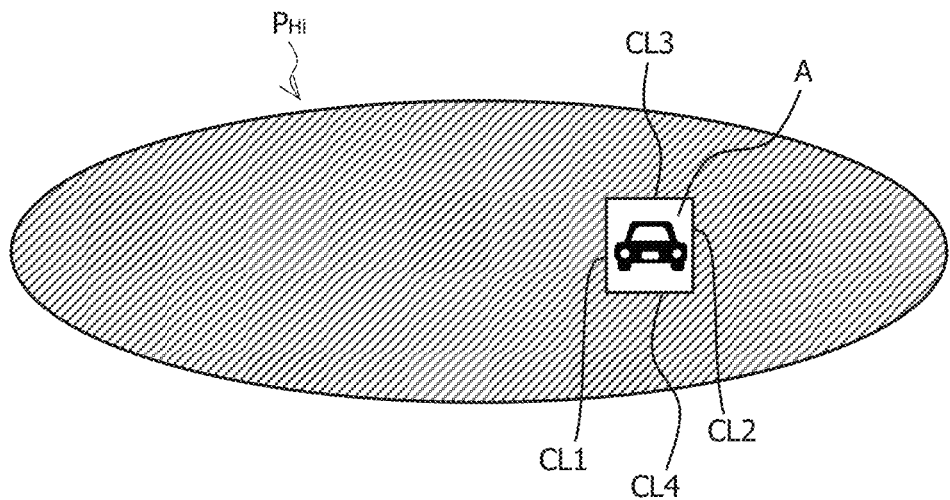
FIG. 17 illustrates another example of a contrast boundary line.

Further, each of the embodiments describes an example in which the high-beam light distribution pattern $P_{Hi}$ including the two contrast boundary lines CL1 and CL2 extending in the vertical direction (perpendicular direction) is used as a prescribed light distribution pattern, but the light distribution pattern is not limited to this. For example, as illustrated in FIG. 17, a high-beam light distribution pattern $P_{Hi}$ including two contrast boundary lines CL1 and CL2 extending in a vertical direction (perpendicular direction) and two contrast boundary lines CL3 and CL4 extending in a lateral direction (horizontal direction) may be used as a prescribed light distribution pattern. In this case, the G-value of at least one of the contrast boundary lines CL3 and CL4 can be changed correspondingly to the detection result of each sensor (for example, the vehicle speed sensor 20, the steering angle sensor 62, or the navigation device 64).

Figure 18:
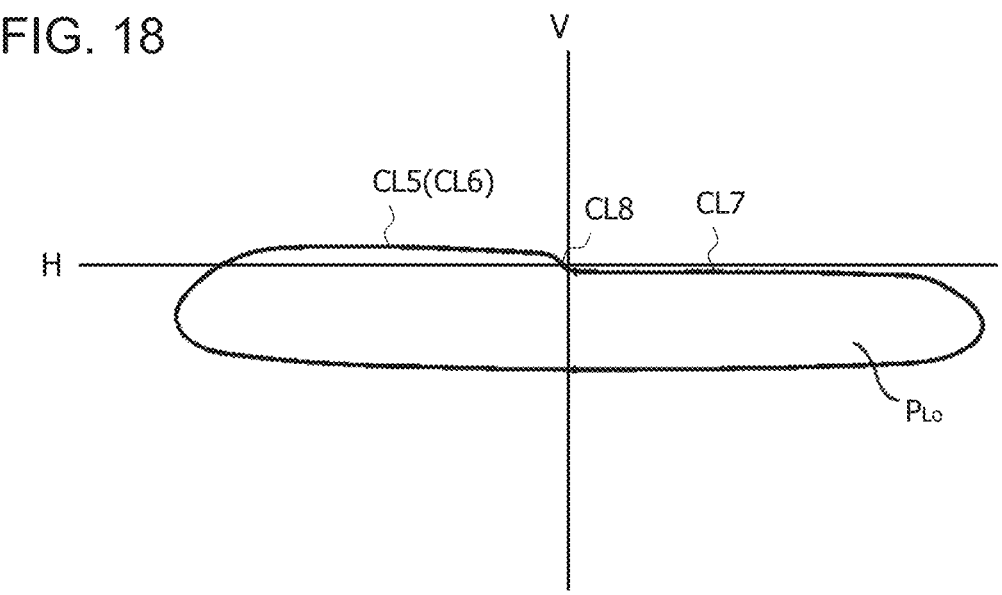
FIG. 18 illustrates another example of a prescribed light distribution pattern.

Further, for example, as illustrated in FIG. 18, a low-beam light distribution pattern $P_{Lo}$ including a contrast boundary line CL5 (a base vehicle lane side contrast boundary line CL6, an opposite lane side contrast boundary line CL7, and an oblique contrast boundary line CL8) at its upper edge can be used as a prescribed light distribution pattern. In this case, the G-value of the contrast boundary line CL5 of the low-beam light distribution pattern $P_{Lo}$ may be changed correspondingly to the detection result of each sensor (particularly the vehicle speed sensor 20).

For example, the G-value of the contrast boundary line CL5 may be increased correspondingly to an increase in a vehicle speed which is the detection result of the vehicle speed sensor 20. Further, the G-value of the contrast boundary line CL5 may be decreased correspondingly to a decrease in a vehicle speed which is the detection result of the vehicle speed sensor 20. At this time, the whole or part of the G-value of the contrast boundary line CL5 may be changed. Here, the part is, for example, at least one of the base vehicle lane side contrast boundary line CL6, the opposite lane side contrast boundary line CL7, and the oblique contrast boundary line CL8, or a central part in the horizontal direction of the contrast boundary line CL5.

Further, the G-value of the opposite lane side contrast boundary line CL7 may be increased when the masked object recognition unit 18 recognizes an oncoming vehicle ahead of the vehicle V0. Similarly, the G-value of the base vehicle lane side contrast boundary line CL6 may be increased when the masked object recognition unit 18 recognizes a preceding vehicle ahead of the vehicle V0. Thus, dazzling light can be prevented from being irradiated onto a masked object with a partial increase in the G-value of a part on a side, where the masked object exists, of the contrast boundary line CL5.

Note that when the vehicle V0 stops, i.e., when a vehicle speed which is the detection result of the vehicle speed sensor 20 becomes zero, the G-value of (the whole or part of) the contrast boundary line CL5 may be increased. Thus, dazzling light can be prevented from being irradiated onto a masked object.

With the modified example, the same effects as those of each of the embodiments may also be produced.

All the numeric values of each of the embodiments are given only for illustration purpose, and appropriate numeric values different from these numeric values can be, of course, used.

Each of the embodiments is given only for illustration purpose in all respects. The present invention is not limited to each of the embodiments in its interpretation. The present invention can be carried out in various ways without departing from its spirit or principal feature.

What is claimed is:

1. A vehicle lamp mounted in a vehicle and configured to form a prescribed light distribution pattern including a contrast boundary line,
   the vehicle lamp comprising:
   a sensor provided in the vehicle; and
   a clearness control unit configured to change clearness of the contrast boundary line correspondingly to a detection result of the sensor; wherein
   the sensor is a sensor configured to detect one of a traveling state and a traveling environment of the vehicle,
   the clearness control unit changes the clearness of the contrast boundary line correspondingly to one of the traveling state and the traveling environment of the vehicle, which is the detection result of the sensor,
   the prescribed light distribution pattern is a high-beam light distribution pattern including a non-irradiation region in which the masked object recognized by the masked object recognition unit is not to be irradiated and an irradiation region, and
   the high-beam light distribution pattern includes the contrast boundary line extending in a vertical direction between the non-irradiation region and the irradiation region,
   the sensor is a vehicle speed sensor configured to detect a vehicle speed of the vehicle, and
   the clearness control unit makes the light intensity change of the contrast boundary line steeper than that of the contrast boundary line formed when the vehicle speed is relatively small, and makes the contrast boundary line clearly visible correspondingly to an increase in the vehicle speed, which is a detection result of the vehicle speed sensor.

2. The vehicle lamp according to claim 1, wherein
   the high-beam light distribution pattern includes two contrast boundary lines extending in the vertical direction between the non-irradiation region and the irradiation region, and
   the clearness control unit changes clearness of at least one of the two contrast boundary lines correspondingly to the detection result of the sensor.

3. The vehicle lamp according to claim 1, wherein
   the clearness control unit makes the light intensity change of the contrast boundary line steeper by increasing the G value of the contrast boundary line correspondingly to an increase in the vehicle speed, which is a detection result of the vehicle speed sensor.

4. The vehicle lamp according to claim 1, wherein
   the vehicle lamp is a light distribution variable head lamp.

5. The vehicle lamp according to claim 1, wherein
   the vehicle lamp includes an optical deflector,
   the prescribed light distribution pattern is formed by light scanned by the light deflector.

6. A vehicle lamp mounted in a vehicle and configured to form a prescribed light distribution pattern including a contrast boundary line,
   the vehicle lamp comprising:
   a sensor provided in the vehicle; and
   a clearness control unit configured to change clearness of the contrast boundary line correspondingly to a detection result of the sensor; wherein
   the sensor is a sensor configured to detect one of a traveling state and a traveling environment of the vehicle,
   the clearness control unit changes the clearness of the contrast boundary line correspondingly to one of the traveling state and the traveling environment of the vehicle, which is the detection result of the sensor,
   the prescribed light distribution pattern is a high-beam light distribution pattern including a non-irradiation region in which the masked object recognized by the masked object recognition unit is not to be irradiated and an irradiation region, and
   the high-beam light distribution pattern includes the contrast boundary line extending in a vertical direction between the non-irradiation region and the irradiation region,
   the sensor is a steering angle sensor configured to detect a steering angle of the vehicle, and the clearness control unit makes the light intensity change of the contrast boundary line steeper than that of the contrast boundary line formed when the steering angle is relatively small, and makes the contrast boundary line clearly visible correspondingly to an increase in the steering angle, which is a detection result of the steering angle sensor.

7. The vehicle lamp according to claim 6, wherein
the high-beam light distribution pattern includes two contrast boundary lines extending in the vertical direction between the non-irradiation region and the irradiation region, and
the clearness control unit changes clearness of at least one of the two contrast boundary lines correspondingly to the detection result of the sensor.

8. The vehicle lamp according to claim 6, wherein
the clearness control unit makes the light intensity change of the contrast boundary line steeper by increasing the G value of the contrast boundary line correspondingly to an increase in the steering angle, which is a detection result of the steering angle sensor.

9. The vehicle lamp according to claim 6, wherein
the vehicle lamp is a light distribution variable head lamp.

10. The vehicle lamp according to claim 6, wherein
the vehicle lamp includes an optical deflector,
the prescribed light distribution pattern is formed by light scanned by the light deflector.

11. A vehicle lamp mounted in a vehicle and configured to form a prescribed light distribution pattern including a contrast boundary line,
the vehicle lamp comprising:
a sensor provided in the vehicle; and
a clearness control unit configured to change clearness of the contrast boundary line correspondingly to a detection result of the sensor; wherein
the sensor is a sensor configured to detect one of a traveling state and a traveling environment of the vehicle,
the clearness control unit changes the clearness of the contrast boundary line correspondingly to one of the traveling state and the traveling environment of the vehicle, which is the detection result of the sensor,
the prescribed light distribution pattern is a high-beam light distribution pattern including a non-irradiation region in which the masked object recognized by the masked object recognition unit is not to be irradiated and an irradiation region,
the high-beam light distribution pattern includes the contrast boundary line extending in a vertical direction between the non-irradiation region and the irradiation region,
the sensor is a navigation device configured to detect a curvature of a scheduled traveling road of the vehicle, and
the clearness control unit makes the light intensity change of the contrast boundary line steeper than that of the contrast boundary line formed when the curvature of the scheduled traveling road of the vehicle is relatively small, and makes the contrast boundary line clearly visible correspondingly to an increase in the curvature of the scheduled traveling road of the vehicle, which is a detection result of the navigation device.

12. The vehicle lamp according to claim 11, wherein
the high-beam light distribution pattern includes two contrast boundary lines extending in the vertical direction between the non-irradiation region and the irradiation region, and
the clearness control unit changes clearness of at least one of the two contrast boundary lines correspondingly to the detection result of the sensor.

13. The vehicle lamp according to claim 11, wherein
the clearness control unit makes the light intensity change of the contrast boundary line steeper by increasing the G value of the contrast boundary line correspondingly to an increase in the vehicle speed, which is a detection result of the vehicle speed sensor.

14. The vehicle lamp according to claim 11, wherein
the vehicle lamp is a light distribution variable head lamp.

15. The vehicle lamp according to claim 11, wherein
the vehicle lamp includes an optical deflector, the prescribed light distribution pattern is formed by light scanned by the light deflector.

16. A vehicle lamp mounted in a vehicle and configured to form a prescribed light distribution pattern including a contrast boundary line,
the vehicle lamp comprising:
a sensor provided in the vehicle; and
a clearness control unit configured to change clearness of the contrast boundary line correspondingly to a detection result of the sensor;
a masked object recognition unit configured to recognize a masked object ahead of the vehicle; wherein
the prescribed light distribution pattern is a high-beam light distribution pattern including a non-irradiation region in which the masked object recognized by the masked object recognition unit is not to be irradiated and an irradiation region,
the high-beam light distribution pattern includes the contrast boundary line extending in a vertical direction between the non-irradiation region and the irradiation region,
the sensor is at least one of a vehicle speed sensor configured to detect a vehicle speed of the vehicle, a steering angle sensor configured to detect a steering angle of the vehicle, and a navigation device configured to detect a traveling environment of the vehicle,
the clearness is a G-value, wherein the G-value is an index indicating inclination of the contrast boundary line.

17. The vehicle lamp according to claim 16, wherein
the vehicle lamp is a light distribution variable head lamp.

18. The vehicle lamp according to claim 16, wherein
the vehicle lamp includes an optical deflector,
the prescribed light distribution pattern is formed by light scanned by the light deflector.

19. A vehicle lamp mounted in a vehicle and configured to form a prescribed light distribution pattern including a contrast boundary line,
the vehicle lamp comprising:
a sensor provided in the vehicle; and
a clearness control unit configured to change clearness of the contrast boundary line correspondingly to a detection result of the sensor; wherein
the clearness control unit changes the clearness of the contrast boundary line by bringing the light intensity peak of the contrast boundary line closer to the contrast boundary line or by moving the peak of the light intensity of the contrast boundary line away from the contrast boundary line correspondingly to a detection result of the sensor, wherein the clearness control unit makes the light intensity peak of the contrast boundary line closer to the contrast boundary line as the detection result of the sensor increases.

20. The vehicle lamp according to claim 19, wherein
the sensor is a vehicle speed sensor configured to detect a vehicle speed of the vehicle, and
the clearness control unit makes the light intensity peak of the contrast boundary line closer to the contrast boundary line as the vehicle speed detected by the vehicle speed sensor increases.

21. The vehicle lamp according to claim 19, wherein
the sensor is a steering angle sensor configured to detect a steering angle of the vehicle, and
the clearness control unit makes the light intensity peak of the contrast boundary line closer to the contrast boundary line as the steering angle detected by the steering angle sensor.

22. The vehicle lamp according to claim 19, wherein
the sensor is a navigation device configured to detect a traveling environment of the vehicle, and
the clearness control unit makes the light intensity peak of the contrast boundary line closer to the contrast boundary line as the curvature of the scheduled traveling road of the vehicle detected by the navigation device.

* * * * *